United States Patent
Kim et al.

(10) Patent No.: US 11,409,441 B2
(45) Date of Patent: Aug. 9, 2022

(54) OPERATION METHOD OF A STORAGE CONTROLLER CONFIGURED TO CONTROL A NONVOLATILE MEMORY DEVICE

(71) Applicant: SAMSUNG ELECTRONICS CO., LTD., Suwon-si (KR)

(72) Inventors: Yeonji Kim, Suwon-si (KR); Youngdeok Seo, Seoul (KR); Chanha Kim, Hwaseong-si (KR); Kangho Roh, Seoul (KR); Hyunkyo Oh, Yongin-si (KR); Heewon Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 22 days.

(21) Appl. No.: 16/999,201

(22) Filed: Aug. 21, 2020

(65) Prior Publication Data
US 2021/0109660 A1 Apr. 15, 2021

(30) Foreign Application Priority Data
Oct. 11, 2019 (KR) .......................... 10-2019-0126049

(51) Int. Cl.
*G06F 3/06* (2006.01)
*G06N 20/00* (2019.01)
*G06F 11/10* (2006.01)

(52) U.S. Cl.
CPC .......... *G06F 3/0614* (2013.01); *G06F 3/0652* (2013.01); *G06F 3/0653* (2013.01);
(Continued)

(58) Field of Classification Search
CPC .... G06F 3/0614; G06F 3/0652; G06F 3/0653; G06F 3/0658; G06F 3/0679; G06F 3/064;
(Continued)

(56) References Cited

U.S. PATENT DOCUMENTS 8,089,804 B2 1/2012 Kim et al.
8,209,468 B2 6/2012 Lee
(Continued)

FOREIGN PATENT DOCUMENTS

KR 10-0843004 7/2008

OTHER PUBLICATIONS

Qiang Wu and Dave Snell, "An Introduction to Incremental Learning", Jul. 2016, Society of Actuaries, Predictive Analytics and Futurism, pp. 18-21 (Year: 2016).*

*Primary Examiner* — Reginald G Bragdon
*Assistant Examiner* — Curtis James Kortman
(74) *Attorney, Agent, or Firm* — F. Chau & Associates, LLC

(57) ABSTRACT

An operation method of a storage controller which includes a nonvolatile memory device, the method including: collecting a first parameter indicating a degradation factor of a first memory area of the nonvolatile memory device and a second parameter indicating a degree of degradation occurring at the first memory area, in an initial driving period; selecting a first function model of a plurality of function models based on the first parameter and the second parameter and predicting a first error tendency of the first memory area based on the first function model; determining a first reliability interval based on the first error tendency; and performing a first reliability operation on the first memory area of the nonvolatile memory device based on the first reliability interval.

18 Claims, 22 Drawing Sheets

(52) U.S. Cl.
CPC .......... *G06F 3/0658* (2013.01); *G06F 3/0679* (2013.01); *G06F 11/1068* (2013.01); *G06N 20/00* (2019.01)

(58) Field of Classification Search
CPC .. G06F 3/0604; G06F 3/0647; G06F 11/1068; G06F 11/1004; G06F 17/18; G06N 20/00; G11C 2029/0409; G11C 29/52; G11C 29/44; G11C 16/3495; G11C 16/3431; G11C 16/349; G11C 16/3422
See application file for complete search history.

(56) References Cited

U.S. PATENT DOCUMENTS

| | | | |
|---|---|---|---|
| 8,612,830 B2 | 12/2013 | Kitahara et al. | |
| 9,406,390 B2 | 8/2016 | Kim et al. | |
| 9,569,120 B2* | 2/2017 | Ryan | G06F 3/061 |
| 9,799,407 B2 | 10/2017 | Moon et al. | |
| 9,916,237 B2* | 3/2018 | Hyun | G06F 12/0246 |
| 10,223,029 B2 | 3/2019 | Gorobets et al. | |
| 10,310,924 B2 | 6/2019 | Jei et al. | |
| 10,936,205 B2* | 3/2021 | Papandreou | G06F 3/0634 |
| 2013/0111299 A1* | 5/2013 | Hashimoto | G06F 11/1068 714/758 |
| 2016/0110249 A1* | 4/2016 | Orme | G06F 11/1016 714/6.24 |
| 2017/0177425 A1* | 6/2017 | Jei | G06F 11/1072 |
| 2019/0361806 A1* | 11/2019 | Hwang | G11C 16/3422 |

* cited by examiner

| 1st Parameter | 2nd Parameter | Function Model | Factor |
|---|---|---|---|
| Read Count | Error Bit | FT11 | a11 |
| | Cell Count | FT12 | a12 |
| P/E Cycle | Error Bit | FT21 | a21 |
| | Cell Count | FT22 | a22 |
| Retention | Error Bit | FT31 | a31 |
| | Cell Count | FT32 | a32 |
| Temperature | Error Bit | FT41 | a41 |
| | Cell Count | FT42 | a42 |

OPERATION METHOD OF A STORAGE CONTROLLER CONFIGURED TO CONTROL A NONVOLATILE MEMORY DEVICE

CROSS-REFERENCE TO RELATED APPLICATION

This application claims priority under 35 U.S.C. § 119 to Korean Patent Application No. 10-2019-0126049 filed on Oct. 11, 2019, in the Korean Intellectual Property Office, the disclosure of which is incorporated by reference herein in its entirety.

TECHNICAL FIELD

Embodiments of the inventive concept described herein relate to a semiconductor memory device, and more particularly, relate to an operation method of a storage controller configured to control a nonvolatile memory device.

DISCUSSION OF RELATED ART

A semiconductor memory device is classified as a volatile memory device or a nonvolatile memory device. A volatile memory device only maintains its data while the device is powered. Examples of the volatile memory device include a static random access memory (SRAM) or a dynamic random access memory (DRAM). A nonvolatile memory device retains data even in the absence of power. Examples of the nonvolatile memory device include a flash memory device, a phase-change RAM (PRAM), a magnetic RAM (MRAM), a resistive RAM (RRAM), or a ferroelectric RAM (FRAM).

The flash memory device is being widely used as a high-capacity storage medium. A physical characteristic of the flash memory device or various ambient factors may lead to a data error in the flash memory device. The data error may be corrected through a separate error correction means. However, an error exceeding an error correction capacity of the separate error correction means may occur. In this case, the reliability of data stored in the flash memory device may not be guaranteed.

SUMMARY

According to an exemplary embodiment of the inventive concept, there is provided an operation method of a storage controller which includes a nonvolatile memory device, the method including: collecting a first parameter indicating a degradation factor of a first memory area of the nonvolatile memory device and a second parameter indicating a degree of degradation occurring at the first memory area, in an initial driving period; selecting a first function model of a plurality of function models based on the first parameter and the second parameter and predicting a first error tendency of the first memory area based on the first function model; determining a first reliability interval based on the first error tendency; and performing a first reliability operation on the first memory area of the nonvolatile memory device based on the first reliability interval.

According to an exemplary embodiment of the inventive concept, there is provided an operation method of a storage controller which is configured to control a nonvolatile memory device, the method including: obtaining a first parameter indicating a degradation factor of a first memory area of the nonvolatile memory device and a second parameter indicating a degree of degradation occurring at the first memory area, in an initial driving period; identifying a first error tendency of the first memory area by performing a machine learning based on a training model trained on an error tendency of the nonvolatile memory device, the first parameter, and the second parameter; determining a first reliability interval based on the first error tendency; and performing a first reliability operation on the first memory area of the nonvolatile memory device based on the first reliability interval.

According to an exemplary embodiment of the inventive concept, there is provided an operation method of a storage controller which is configured to control a nonvolatile memory device, the method including: collecting a first parameter set from a first memory area of the nonvolatile memory device and collecting a second parameter set from a second memory area of the nonvolatile memory device, in an initial driving period; predicting a first error tendency of the first memory area based on the first parameter set and predicting a second error tendency based on the second parameter set; deciding a first reliability interval based on the first error tendency and deciding a second reliability interval based on the second error tendency; and performing a first reliability operation on the first memory area based on the first reliability interval and performing a second reliability operation on the second memory area based on the second reliability interval.

According to an exemplary embodiment of the inventive concept, there is provided an operation method of a storage controller which includes a nonvolatile memory device, the method including: obtaining a first parameter corresponding to a degradation factor applied a first memory area of the nonvolatile memory device and a second parameter corresponding to an amount of degradation at the first memory area; selecting a first function model from a plurality of function models based on the first parameter and the second parameter and determining an error magnitude of the first memory area based on the first function model; determining a reliability interval based on the error magnitude; and performing a reliability operation on the first memory area of the nonvolatile memory device based on the reliability interval.

BRIEF DESCRIPTION OF THE FIGURES

The above and other features of the inventive concept will become more apparent by describing in detail exemplary embodiments thereof with reference to the accompanying drawings.

FIGS. 7A, 7B and 7C are diagrams for describing an operation according to the flowchart of FIG. 6.

DETAILED DESCRIPTION OF THE EMBODIMENTS

Hereinafter, exemplary embodiments of the inventive concept will be described in detail. The terms "unit", "module", etc. used in this specification may be implemented in the form of hardware, software, or a combination thereof and may be configured to perform the various functions hereinafter described.

Figure 1:
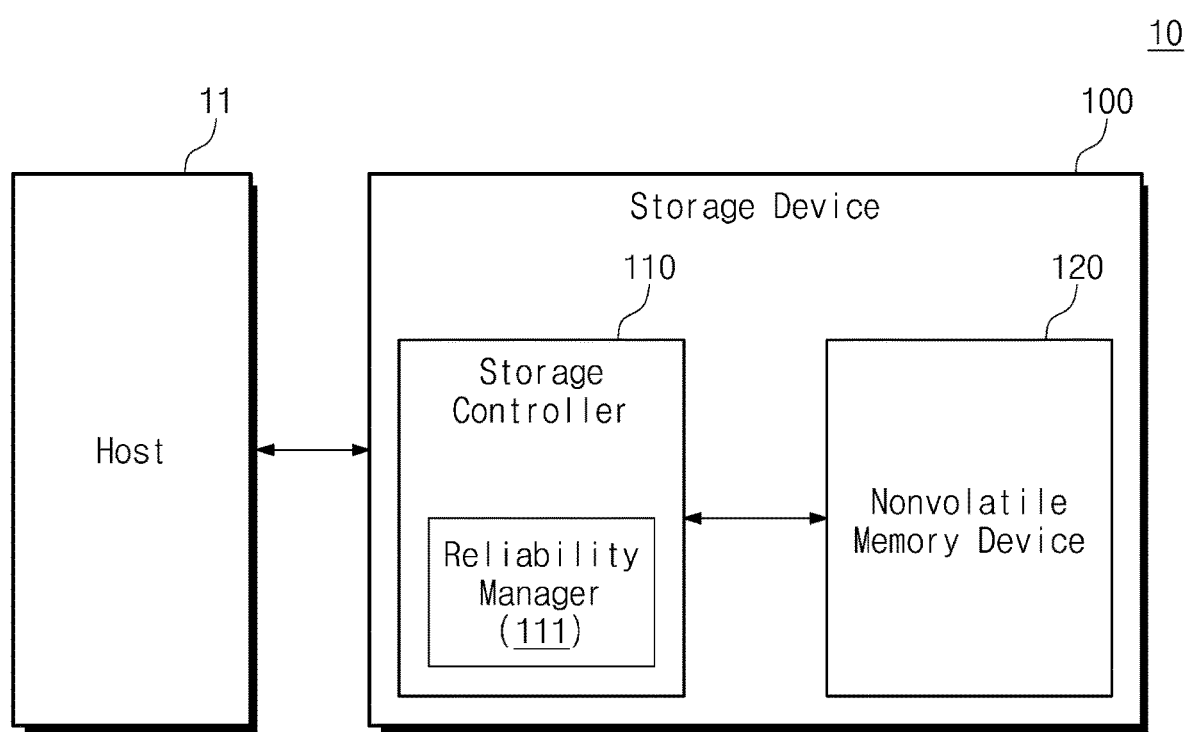
FIG. 1 is a block diagram illustrating a storage system according to an exemplary embodiment of the inventive concept.

FIG. 1 is a block diagram illustrating a storage system according to an exemplary embodiment of the inventive concept. Referring to FIG. 1, a storage system 10 may include a host 11 and a storage device 100. In an exemplary embodiment of the inventive concept, the storage system 10 may be a computing system, which is configured to process various information, such as a personal computer (PC), a notebook, a laptop, a server, a workstation, a tablet PC, a smartphone, a digital camera, or a black box.

The host 11 may control overall operations of the storage system 10. For example, the host 11 may store data in the storage device 100 or may read data stored in the storage device 100. Under the control of the host 11, the storage device 100 may store data or may provide the stored data to the host 11. The storage device 100 may include a storage controller 110 and a nonvolatile memory device 120.

The storage controller 110 may store data in the nonvolatile memory device 120 or may read data stored in the nonvolatile memory device 120. The nonvolatile memory device 120 may operate under the control of the storage controller 110. In an exemplary embodiment of the inventive concept, the nonvolatile memory device 120 may be a NAND flash memory device, but the inventive concept is not limited thereto. For example, the nonvolatile memory device 120 may be one of various storage devices, which retain data stored therein even when not powered, such as a phase-change RAM (PRAM), a magnetic RAM (MRAM), a resistive RAM (RRAM), or a ferroelectric RAM (FRAM).

In an exemplary embodiment of the inventive concept, the storage controller 110 may include a reliability manager 111. The reliability manager 111 may perform or manage various reliability management operations (hereinafter referred to as a "reliability operation") for guaranteeing the reliability of data stored in the nonvolatile memory device 120. For example, data stored in the nonvolatile memory device 120 may include an error due to various factors. The error of the data stored in the nonvolatile memory device 120 may be detected or corrected through a separate error correction means (e.g., an error-correcting code (ECC) engine or various error correction operations). In this case, when the error of the data exceeds an error correction level correctable by the separate error correction means, the reliability of data stored in the nonvolatile memory device 120 may not be guaranteed. In other words, the data stored in the nonvolatile memory device 120 may be lost.

The reliability manager 111 may monitor the data stored in the nonvolatile memory device 120 every regular interval. In the case where a level of the error of the data stored in the nonvolatile memory device 120 is a given level or higher, the reliability manager 111 may guarantee the reliability of the data by correcting the error of the data and storing or moving the error-corrected data in another area of the nonvolatile memory device 120 or in another nonvolatile memory device.

A conventional reliability operation is performed based on a predetermined interval. For example, the conventional storage device performs the reliability operation every predetermined interval. The predetermined interval is determined based on the degree of degradation of a nonvolatile memory device. The nonvolatile memory device may include a plurality of memory blocks, and the plurality of memory blocks may have different degradation levels. In other words, an error increase rate of data that are stored in a memory block having a large degree of degradation may be relatively large, and an error increase rate of data that are stored in a memory block having a small degree of degradation may be relatively small. The predetermined interval is determined based on a memory block having the largest degree of degradation from among a plurality of memory blocks included in a nonvolatile memory device. In this case, the reliability operation is frequently and unnecessarily performed on memory blocks having the small degree of degradation. Therefore, the overall performance of the storage device may decrease.

The storage device 100 according to an exemplary embodiment of the inventive concept may determine an interval of the reliability operation (hereinafter referred to as a "reliability interval") based on a characteristic of the nonvolatile memory device 120 collected during driving (or in runtime). In this case, because different reliability intervals are applied to the plurality of memory blocks of the nonvolatile memory device 120, the reliability operation optimized to the degree of degradation of each of the plurality of memory blocks may be performed. Accordingly, the performance of the storage device 100 may be prevented from decreasing.

Figure 2:
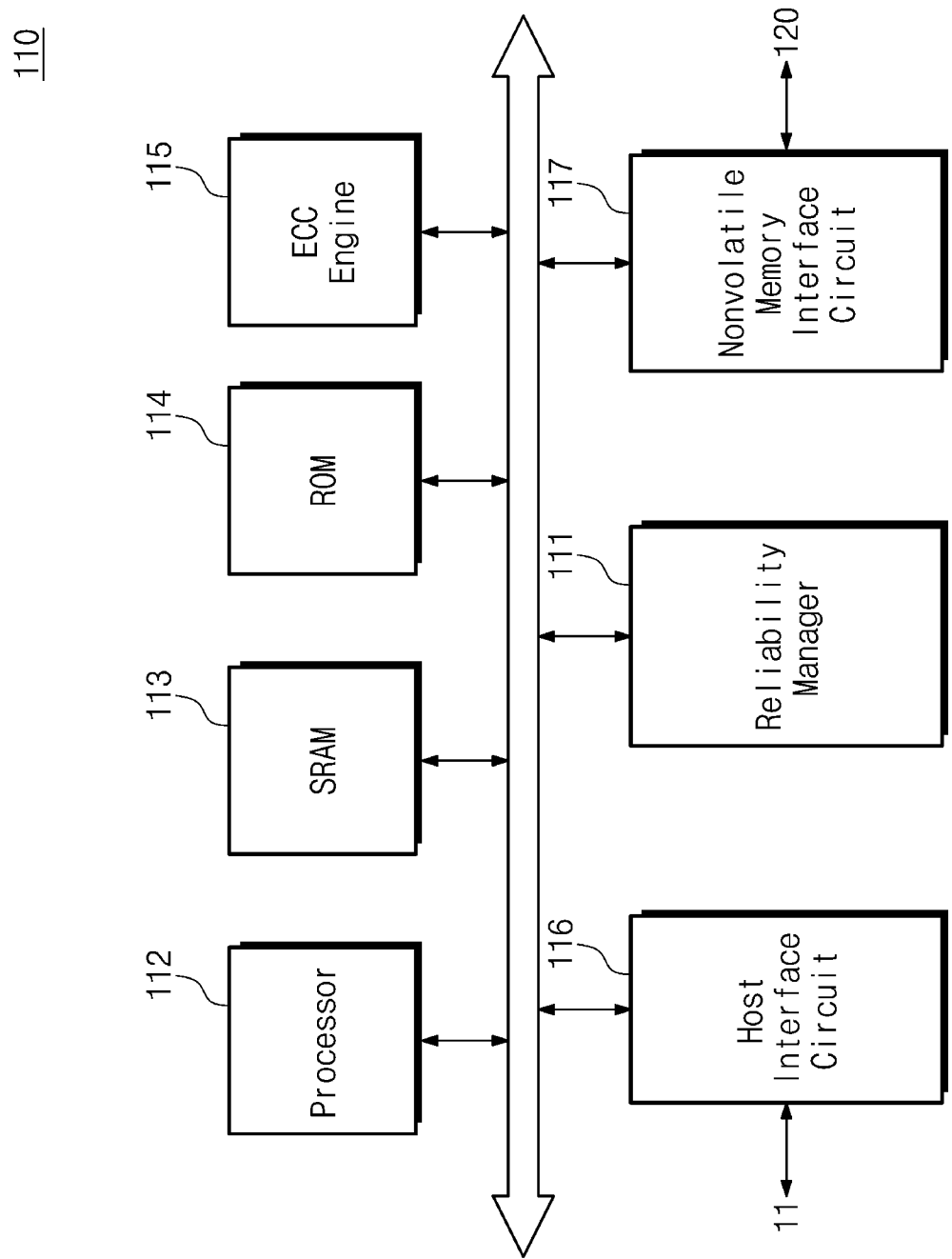
FIG. 2 is a block diagram illustrating a storage controller of FIG. 1.

FIG. 2 is a block diagram illustrating a storage controller of FIG. 1. Referring to FIGS. 1 and 2, the storage controller 110 may include the reliability manager 111, a processor 112, a static random access memory (SRAM) 113, a read only memory (ROM) 114, an ECC engine 115, a host interface circuit 116, and a nonvolatile memory interface circuit 117. The components of the storage controller 110 may be communicably coupled to each other via a bus.

The reliability manager 111 may perform or manage the reliability operation on the nonvolatile memory device 120. In an exemplary embodiment of the inventive concept, the reliability manager 111 may adjust and manage a reliability interval for performing the reliability operation. An operation and a configuration of adjusting or managing the reliability interval of the reliability manager 111 will be more fully described with reference to the accompanying drawings.

The processor 112 may control overall operations of the storage controller 110. The SRAM 113 may be used as a buffer memory, a cache memory, or a working memory of the storage controller 110. The ROM 114 may store a variety of information, which is necessary for the storage controller 110 to operate, in the form of firmware. In an exemplary embodiment of the inventive concept, the reliability manager 111 may be implemented in the form of software, hardware, or a combination thereof. In the case where the reliability manager 111 is provided in the form of software, the reliability manager 111 may be stored in the SRAM 113 and may be driven by the processor 112.

The ECC engine 115 may detect and correct an error of data read from the nonvolatile memory device 120. In an exemplary embodiment of the inventive concept, the ECC engine 115 may have an error correction capacity of a given level. In the case where an error of data read from the nonvolatile memory device 120 exceeds an error correction capacity of the ECC engine 115, the error of the data read from the nonvolatile memory device 120 may not be corrected. To prevent a situation that an error is uncorrectable by the ECC engine 115, the reliability manager 111 may perform the reliability operation based on a reliability interval such that an error of data stored in the nonvolatile memory device 120 does not exceed the error correction capacity of the ECC engine 115.

The storage controller 110 may communicate with the host 11 through the host interface circuit 116. In an exemplary embodiment of the inventive concept, the host interface circuit 116 may be implemented based on at least one of various interfaces such as a Serial Advanced Technology Attachment (SATA) interface, a Peripheral Component Interconnect Express (PCIe) interface, a Serial Attached Small Computer System Interface (SAS) interface, a Nonvolatile Memory express (NVMe) interface, and a Universal Flash Storage (UFS) interface.

The storage controller 110 may communicate with the nonvolatile memory device 120 through the nonvolatile memory interface circuit 117. In an exemplary embodiment of the inventive concept, the nonvolatile memory interface circuit 117 may be a NAND interface.

Figure 3A:
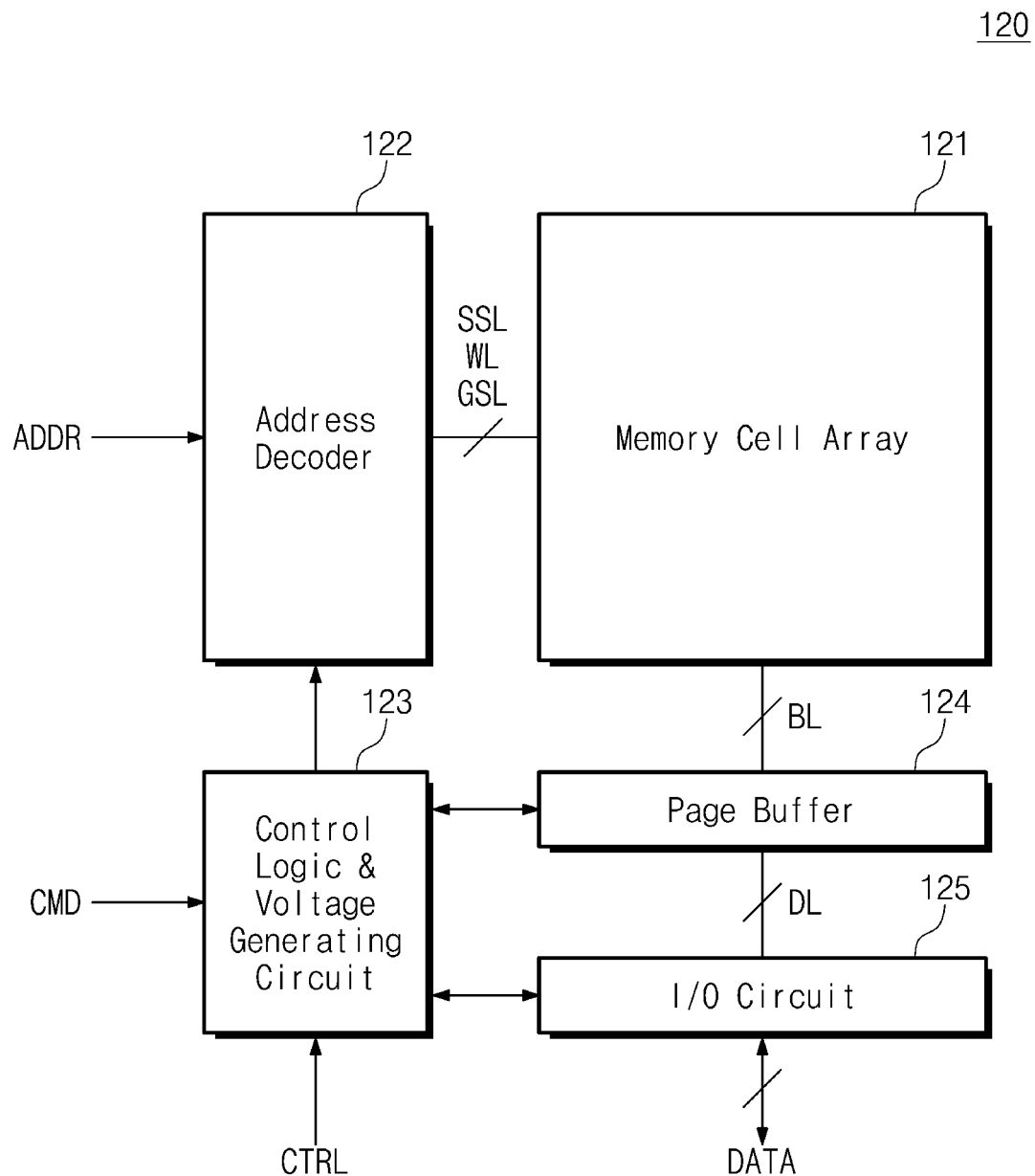
FIG. 3A is a block diagram illustrating a nonvolatile memory device of FIG. 1.
Figure 3B:
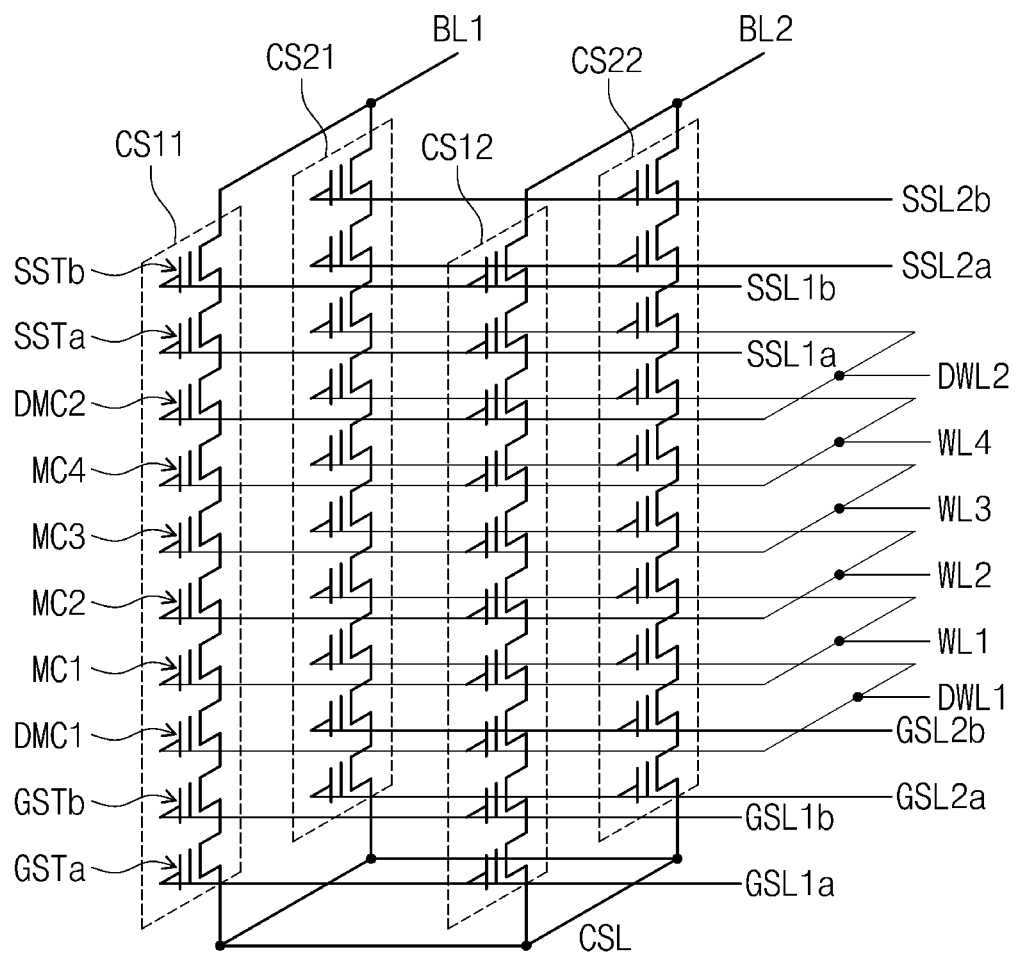
FIG. 3B is a diagram illustrating a memory block of a plurality of memory blocks included in a memory cell array in FIG. 3A.

FIG. 3A is a block diagram illustrating a nonvolatile memory device of FIG. 1. FIG. 3B is a diagram illustrating a memory block of a plurality of memory blocks of a memory cell array in FIG. 3A. Referring to FIGS. 1, 3A, and 3B, the nonvolatile memory device 120 may include a memory cell array 121, an address decoder 122, a control logic and voltage generating circuit 123, a page buffer 124, and an input/output circuit 125.

The memory cell array 121 may include a plurality of memory blocks. A structure of each of the plurality of memory blocks may be similar to a structure of a first memory block BLK1 illustrated in FIG. 3B. The first memory block BLK1 illustrated in FIG. 3B may correspond to a physical erase unit of the nonvolatile memory device 120, but the inventive concept is not limited thereto. The physical erase unit may be changed to a page unit, a word line unit, a sub-block unit, etc.

As illustrated in FIG. 3B, the first memory block BLK1 may include a plurality of cell strings CS11, CS12, CS21, and CS22. The cell strings CS11, CS12, CS21, and CS22 may be arranged along a row direction and a column direction. For brevity of illustration, four cell strings CS11, CS12, CS21, and CS22 are illustrated in FIG. 3B, but the inventive concept is not limited thereto. For example, the number of cell strings may increase or decrease in the row direction or the column direction.

Cell strings positioned at the same column from among the plurality of cell strings CS11, CS12, CS21, and CS22 may be connected with the same bit line. For example, the cell strings CS11 and CS21 may be connected to a first bit line BL1, and the cell strings CS12 and CS22 may be connected to a second bit line BL2. Each of the plurality of cell strings CS11, CS12, CS21, and CS22 may include a plurality of cell transistors. Each of the plurality of cell transistors may include a charge trap flash (CTF) memory cell. The plurality of cell transistors may be stacked in a height direction that is a direction perpendicular to a plane (e.g., a semiconductor substrate) defined by the row direction and the column direction.

In each cell string, the plurality of cell transistors may be connected in series between a corresponding bit line (e.g., BL1 or BL2) and a common source line CSL. For example, the plurality of cell transistors may include string selection transistors SSTa and SSTb, dummy memory cells DMC1 and DMC2, memory cells MC1, MC2, MC3 and MC4, and ground selection transistors GSTa and GSTb. The serially-connected string selection transistors SSTa and SSTb may be provided between serially-connected memory cells MC1 to MC4 and a corresponding bit line (e.g., BL1 and BL2). The serially-connected ground selection transistors GSTa and GSTb may be provided between the serially-connected memory cells MC1 to MC4 and the common source line CSL. In an exemplary embodiment of the inventive concept, the second dummy memory cell DMC2 may be provided between the serially-connected string selection transistors SSTb and SSTa and the serially-connected memory cells MC1 to MC4, and the first dummy memory cell DMC1 may be provided between the serially-connected memory cells MC1 to MC4 and the serially-connected ground selection transistors GSTb and GSTa.

In each of the plurality of cell strings CS11, CS12, CS21, and CS22, memory cells positioned at the same height from among the memory cells MC1 to MC4 may share the same word line. For example, the first memory cells MC1 of the plurality of cell strings CS11, CS12, CS21, and CS22 may be positioned at the same height from the substrate and may share a first word line WL1. The second memory cells MC2 of the plurality of cell strings CS11, CS12, CS21, and CS22 may be positioned at the same height from the substrate and may share a second word line WL2. Likewise, the third memory cells MC3 of the plurality of cell strings CS11, CS12, CS21, and CS22 may be positioned at the same height from the substrate and may share a third word line WL3, and the fourth memory cells MC4 of the plurality of cell strings CS11, CS12, CS21, and CS22 may be positioned at the same height from the substrate and may share a fourth word line WL4.

In each of the plurality of cell strings CS11, CS12, CS21, and CS22, the dummy memory cells DMC1 or DMC2 positioned at the same height may share the same dummy word line. For example, the first dummy memory cells DMC1 of the plurality of cell strings CS11, CS12, CS21, and CS22 may share a first dummy word line DWL1, and the second dummy memory cells DMC2 of the plurality of cell strings CS11, CS12, CS21, and CS22 may share a second dummy word line DWL2. The first dummy word line DWL1 may be adjacent to the first word line WL1 and the second dummy word line DWL2 may be adjacent to the fourth word line WL4.

In each of the plurality of cell strings CS11, CS12, CS21, and CS22, the string selection transistor SSTa or SSTb positioned at the same height and the same row may share the same string selection line. For example, the string selection transistors SSTb of the cell strings CS11 and CS12 may share a string selection line SSL1b, and the string selection transistors SSTa of the cell strings CS11 and CS12 may share a string selection line SSL1a. The string selection transistors SSTb of the cell strings CS21 and CS22 may share a string selection line SSL2b, and the string selection transistors SSTa of the cell strings CS21 and CS22 may share a string selection line SSL2a. In each of the plurality of cell strings CS11, CS12, CS21, and CS22, string selection transistors positioned at the same row from among the string selection transistors SSTa and SSTb may share the same string selection line. For example, the string selection transistors SSTb and SSTa of the cell strings CS11 and CS12 may share a first string selection line, and the string selection transistors SSTb and SSTa of the cell strings CS21 and CS22 may share a second string selection line different from the first string selection line.

In the plurality of cell strings CS11, CS12, CS21, and CS22, ground selection transistors positioned at the same height and the same row from among the ground selection transistors GST1b and GST1a may share the same ground selection line. For example, the ground selection transistors GSTb of the cell strings CS11 and CS12 may be connected with a ground selection line GSL1b, and the ground selection transistors GSTa of the cell strings CS11 and CS12 may share a ground selection line GSL1a. The ground selection transistors GSTb of the cell strings CS21 and CS22 may be connected with a ground selection line GSL2b, and the ground selection transistors GSTa of the cell strings CS21 and CS22 may share a ground selection line GSL2a. In the plurality of cell strings CS11, CS12, CS21, and CS22, the ground selection transistors GSTa or GSTb may share the same ground selection line. In the plurality of cell strings CS11, CS12, CS21, and CS22, ground selection transistors positioned at the same height from among the ground selection transistors GSTa and GSTb may share the same ground selection line. Alternatively, ground selection transistors positioned at the same row from among the ground selection transistors GSTa and GSTb of the plurality of cell strings CS11, CS12, CS21, and CS22 may share the same ground selection line.

In an exemplary embodiment of the inventive concept, the first memory block BLK1 illustrated in FIG. 3B is an example. For example, the number of cell strings may increase or decrease, and the number of rows of cell strings and the number of columns of cell strings may increase or decrease according to the number of cell strings. In addition, in the first memory block BLK1, the number of cell transistors may increase or decrease, and the height of the first memory block BLK1 may increase or decrease depending on the number of cell transistors. In addition, the number of lines connected with cell transistors may increase or decrease depending on the number of cell transistors.

Returning to FIG. 3A, the address decoder 122 may be connected with the memory cell array 121 through string selection lines SSL, word lines WL, and ground selection lines GSL. The address decoder 122 may decode an address ADDR received from the storage controller 110 and may control the string selection lines SSL, the word lines WL, and the ground selection lines GSL based on the decoded address.

The control logic and voltage generating circuit 123 may receive a command CMD and a control signal CTRL from the storage controller 110. The control logic and voltage generating circuit 123 may control the address decoder 122, the page buffer 124, and the input/output circuit 125 in response to a signal received from the storage controller 110. The control logic and voltage generating circuit 123 may generate various voltages (e.g., read voltages, program voltages, verification voltages, and erase voltages) necessary for the nonvolatile memory device 120 to operate.

The page buffer 124 may be connected with the memory cell array 121 through bit lines BL. The page buffer 124 may receive data from the input/output circuit 125 through a data line DL. The page buffer 124 may store data in the memory cell array 121 by controlling the bit lines BL based on the received data. The page buffer 124 may read data stored in the memory cell array 121 by sensing voltages of the bit lines BL. The page buffer 124 may provide the read data to the input/output circuit 125 through the data line DL.

The input/output circuit 125 may be connected with the page buffer 124 through the data line DL. The input/output circuit 125 may provide data received from the storage controller 110 to the page buffer 124 through the data line DL The input/output circuit 125 may transfer the data received through the data line DL to the storage controller 110.

In an exemplary embodiment of the inventive concept, the address ADDR, the command CMD, the control signal CTRL, and the data "DATA" described with reference to FIG. 3A may be transmitted/received through the nonvolatile memory interface circuit 117 of the storage controller 110.

Figure 4:
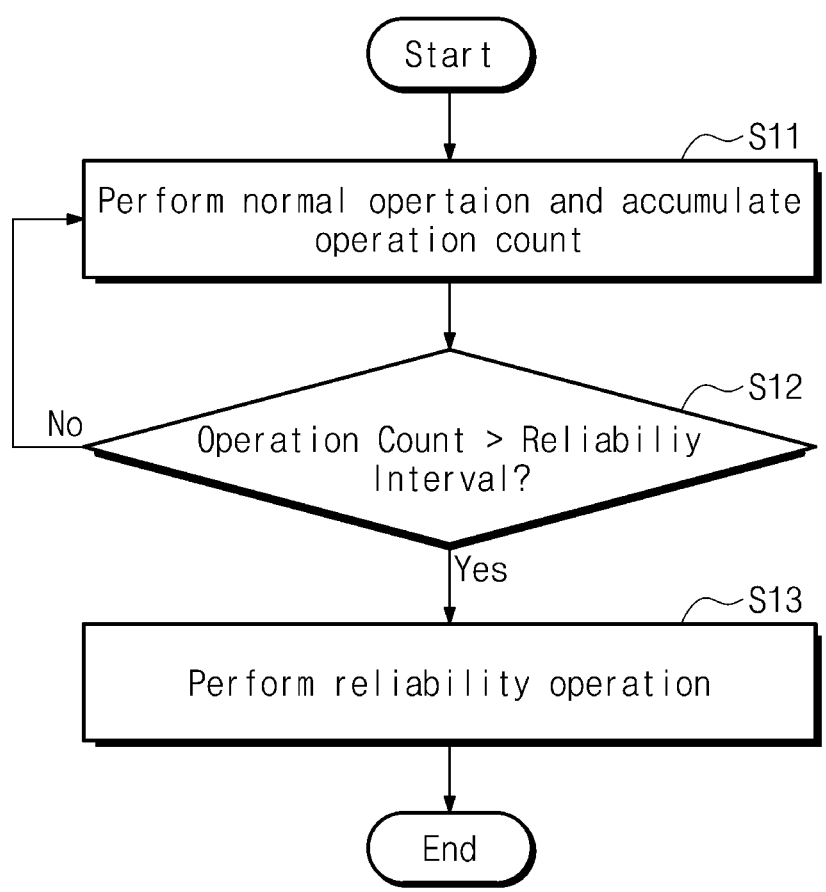
FIG. 4 is a flowchart illustrating a reliability operation of a storage device of FIG. 1.

FIG. 4 is a flowchart illustrating a reliability operation of a storage device of FIG. 1. Referring to FIGS. 1 and 4, in operation S11, the storage device 100 may perform a normal operation (e.g., a read operation, a program operation, or an erase operation). At the same time, the storage device 100 may accumulate an operation count. The operation count may indicate the number of times an operation (e.g., a read operation, a program operation, or an erase operation) is performed on the nonvolatile memory device 120 of the storage device 100. In an exemplary embodiment of the inventive concept, the operation count may be accumulated in units of a memory block, a word line, a page, a sub-block, a super block, a plane, or a chip.

In operation S12, the storage device 100 may determine whether the accumulated operation count is greater than a reliability interval. In other words, the storage device 100 may determine whether the accumulated operation count reaches the reliability interval. When the accumulated operation count is smaller than the reliability interval, the storage device 100 continues to perform operation S11.

When the accumulated operation count is greater than the reliability interval (e.g., when the accumulated operation count reaches the reliability interval), in operation S13, the storage device 100 may perform the reliability operation. For example, the storage device 100 may perform a read operation on a particular memory block corresponding to the accumulated operation count reaching the reliability interval. In this case, the read operation may be performed on at least one of a plurality of word lines included in the particular memory block. The storage device 100 may perform an error detection operation on a result of the read operation (e.g., on data read from the particular memory block). In the case where the detected error is greater than a reference value, the probability that an error of the data stored in the particular memory block is not recovered (or corrected) may be high. Accordingly, to guarantee the reliability of the data stored in the particular memory block, in the case where a magnitude of the error detected by the error detection operation is greater than a reference value, the storage device 100 may move the data stored in the particular memory block to another memory block. In other words, the storage device 100 may perform the reliability operation. In an exemplary embodiment of the inventive concept, the storage device 100 may read data stored in the particular memory block, may correct an error of the read data, and may program the error-corrected data in another memory block. As the above reliability operation is performed, the reliability of data stored in a particular memory block having the high error occurrence probability may be guaranteed.

In an exemplary embodiment of the inventive concept, the reliability operation corresponding to operation S13 may be performed without an explicit request from the host 11. For example, even though the explicit request is not provided from the host 11, the storage device 100 may perform the reliability operation when the condition in operation S12 is satisfied (e.g., when the accumulated operation count reaches the reliability interval).

In an exemplary embodiment of the inventive concept, the reliability operation corresponding to operation S13 may be performed along with an explicit request from the host 11. For example, when the condition in operation S12 is satisfied (e.g., when the accumulated operation count reaches the reliability interval) and an operation of the nonvolatile memory device 120 is requested by the host 11, the storage device 100 may perform the reliability operation on a particular memory block while performing the operation requested by the host 11.

In an exemplary embodiment of the inventive concept, after the operation S13, the storage device 100 may reset the accumulated operation count. In an exemplary embodiment of the inventive concept, the reset operation may be omitted. For example, the storage device 100 may accumulate the operation count depending on a particular unit and may compare an increment of the accumulated operation count and the reliability interval. In this case, the operation of resetting the operation count, in other words, the reset operation may be omitted. In an exemplary embodiment of the inventive concept, the operation according to the flowchart of FIG. 4 may be performed by the storage controller 110 or the reliability manager 111.

As described above, the storage device 100 according to an exemplary embodiment of the inventive concept may perform the reliability operation every reliability interval and may guarantee the reliability of data stored in the nonvolatile memory device 120. In an exemplary embodiment of the inventive concept, the storage device 100 or the storage controller 110 may collect a characteristic of the nonvolatile memory device 120 in runtime and may adaptively adjust or manage the reliability interval based on the collected characteristic. In this case, because the reliability operation is performed based on the reliability interval optimized to the characteristic of the nonvolatile memory device 120, the number of times that the reliability operation is performed on a memory block having a small degree of degradation may decrease. Accordingly, the overall performance of the storage device 100 may be prevented from decreasing.

Figure 5:
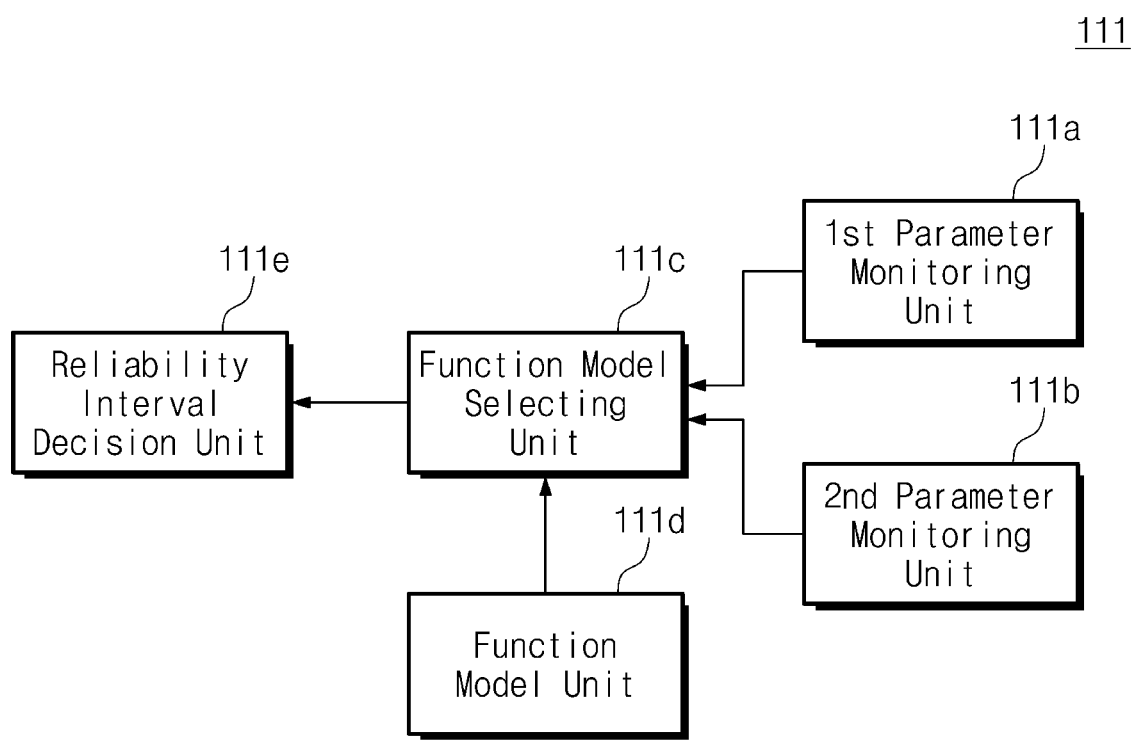
FIG. 5 is a block diagram illustrating a reliability manager of FIG. 1.

FIG. 5 is a block diagram illustrating a reliability manager of FIG. 1. A configuration of the reliability manager 111 that adaptively adjusts or manages the reliability interval will be described with reference to FIG. 5. For convenience of description, below, it is assumed that the reliability manager 111 manages the reliability interval in units of a memory block. However, the inventive concept is not limited thereto. The reliability interval may be managed in units of a memory area such as a memory block, a word line, a page, a sub-block, a super block, a plane, or a chip.

Referring to FIGS. 1 and 5, the reliability manager 111 may include first and second parameter monitoring units 11a and 11b, a function model selecting unit 111c, a function model unit 111d, and a reliability interval decision unit 111e. The first and second parameter monitoring units 111a and 111b may monitor first and second parameters of the nonvolatile memory device 120 in real time or in driving. The first and second parameter monitoring units 111a and 111b may be implemented as circuits. The first parameter may include various information such as an operation count (e.g., a read count), the number of program/erase cycles, an operation elapsed time, a data retention time (hereinafter referred to as a "retention") of each memory block, or a temperature. The second parameter may include various information such as the number of error bits or a cell count value of each memory block. In an exemplary embodiment of the inventive concept, the cell count value may indicate a difference of a reference value and a value obtained by counting on-cells or off-cells of memory cells connected to a word line by using a particular level. In this case, a magnitude of a cell count value may indicate the degree of degradation (e.g., an error magnitude).

In an exemplary embodiment of the inventive concept, the first parameter may be a factor indicating the degree of degradation forced to each memory block of the nonvolatile memory device 120. In other words, the first parameter may be a degradation factor of a particular memory block. The second parameter may be a factor indicating the degree of degradation occurring at each memory block of the nonvolatile memory device 120. The degree of degradation forced to each memory block may be a factor that causes the nonvolatile memory device 120 to degrade and thus causes an error in the nonvolatile memory device 120. The degree of degradation occurring at each memory block may be a factor indicating a magnitude of an error that occurs at the nonvolatile memory device 120. For example, as the degree of degradation forced to a particular memory block increases, the degree of degradation occurring at the particular memory block may increase. In other words, as the first parameter increases, the second parameter may increase.

In this case, because memory blocks included in the nonvolatile memory device 120 have different physical characteristics, a ratio of the degree of degradation occurred to the degree of degradation forced may be variable for each memory block. For example, although the degree of degradation forced to a first memory block is identical to the degree of degradation forced to a second memory block, since there is a difference in physical characteristics between the first and second memory blocks, the degree of degradation occurring at the first memory block may be different from the degree of degradation occurring at the second memory block. Alternatively, although an increment of the degree of degradation forced to a first memory block is identical to an increment of the degree of degradation forced to a second memory block, since there is a difference in physical characteristics between the first and second memory blocks, an increment of the degree of degradation occurring at the first memory block may be different from an increment of the degree of degradation occurring at the second memory block.

Due to the physical characteristic difference, by applying the same reliability interval to the first and second memory blocks, the reliability operation may be unnecessarily and frequently performed on one of the first and second memory blocks. In other words, the reliability operation may be unnecessarily and frequently performed on a memory block having a small degree of degradation, thereby leading to a performance decrease in the storage device 100.

The function model selecting unit 111c may collect the first parameter of a particular memory block from the first parameter monitoring unit 111a and may collect the second parameter of the particular memory block from the second parameter monitoring unit 111b. In other words, the function model selecting unit 111c may obtain the first and second parameters. The function model selecting unit 111c may select one of a plurality of function models included in the function model unit 111d based on the first and second parameters thus collected. The function model selecting unit 111c may predict the tendency of error of the particular memory block based on the selected function model. In an exemplary embodiment of the inventive concept, the tendency of error may indicate a magnitude of an error which will occur with regard to the degree of degradation forced after a current time, at the nonvolatile memory device 120 or the particular memory block. In other words, the tendency of error may indicate a relationship between the first parameter and the second parameter after a current time.

For example, the function model unit 111d may include a plurality of function models that are modeled in advance. In other words, the function model unit 111d may be a storage. The plurality of function models may be function models obtained by modeling an increment of an error based on the first and second parameters received from various memory blocks. The function model selecting unit 111c may select one of the plurality of function models based on a ratio or a combination of the collected first parameter and the collected second parameter. The selected function model may be a function model corresponding to the first and second parameters collected by the function model selecting unit 111c, and the selected function model may indicate the tendency of error of a particular memory block. In other words, the tendency of error that will occur later with regard to a particular memory block may be predicted based on a function model selected by the function model selecting unit 111c. For example, in the case where the first parameter of the particular memory block increases as much as a first value, how much the second parameter of the particular memory block increases may be determined based on the function model selected by the function model selecting unit 111c.

The reliability interval decision unit 111e may decide or adjust the reliability interval of the particular memory block based on the function model selected by the function model selecting unit 111c. For example, as described above, the tendency of error of the particular memory block may be determined by the selected function model. The reliability interval decision unit 111e may decide a first value of the first parameter by which an error of a first magnitude occurs, and a second value of the first parameter by which an error of a second magnitude occurs, based on the selected function model. The reliability interval decision unit 111e may decide the reliability interval based on the first value and the second value. In an exemplary embodiment of the inventive concept, the first magnitude of the error may be smaller than the maximum error correction amount decided based on an error correction capacity of the ECC engine 115, and the second magnitude of the error may correspond to the maximum error correction amount decided based on the error correction capacity of the ECC engine 115. In other words, the second magnitude of the error may be greater than the first magnitude of the error. In an exemplary embodiment of the inventive concept, the reliability interval may correspond to a magnitude obtained by dividing a difference of the first value and the second value by a given magnitude.

As described above, the reliability manager 111 may monitor the first and second parameters of respective memory blocks of the nonvolatile memory device 120 in real time or when the nonvolatile memory device 120 is driven and may individually decide or adjust the reliability interval of each memory block based on the first and second parameters. Accordingly, because the reliability interval to be applied varies depending on the degree of degradation of each memory block, an unnecessary reliability operation may be prevented, and the performance of the storage device 100 may be improved.

Figure 6:
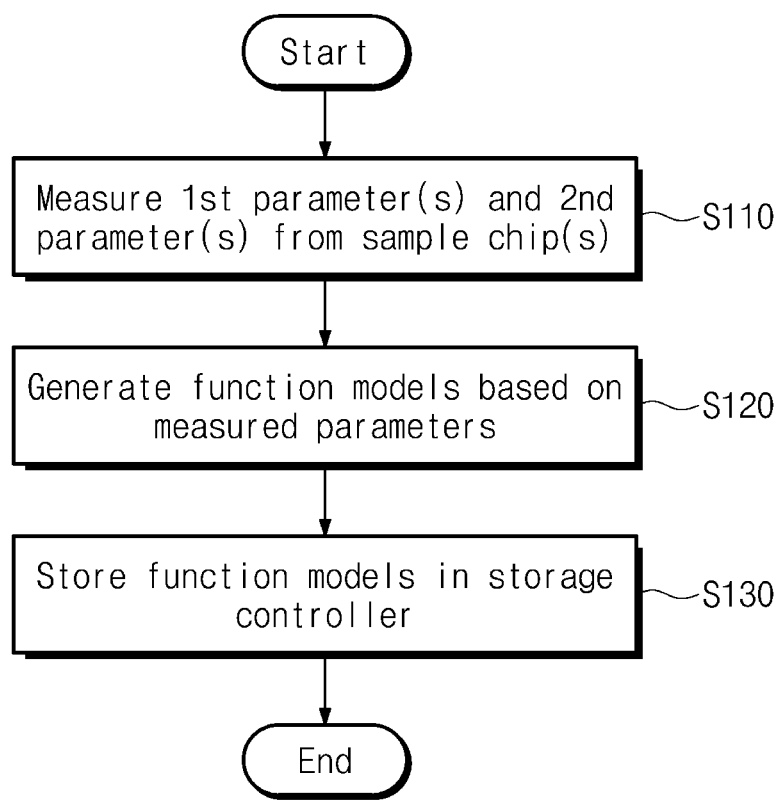
FIG. 6 is a flowchart illustrating a method for generating a function model unit of FIG. 5.
Figure 7A:
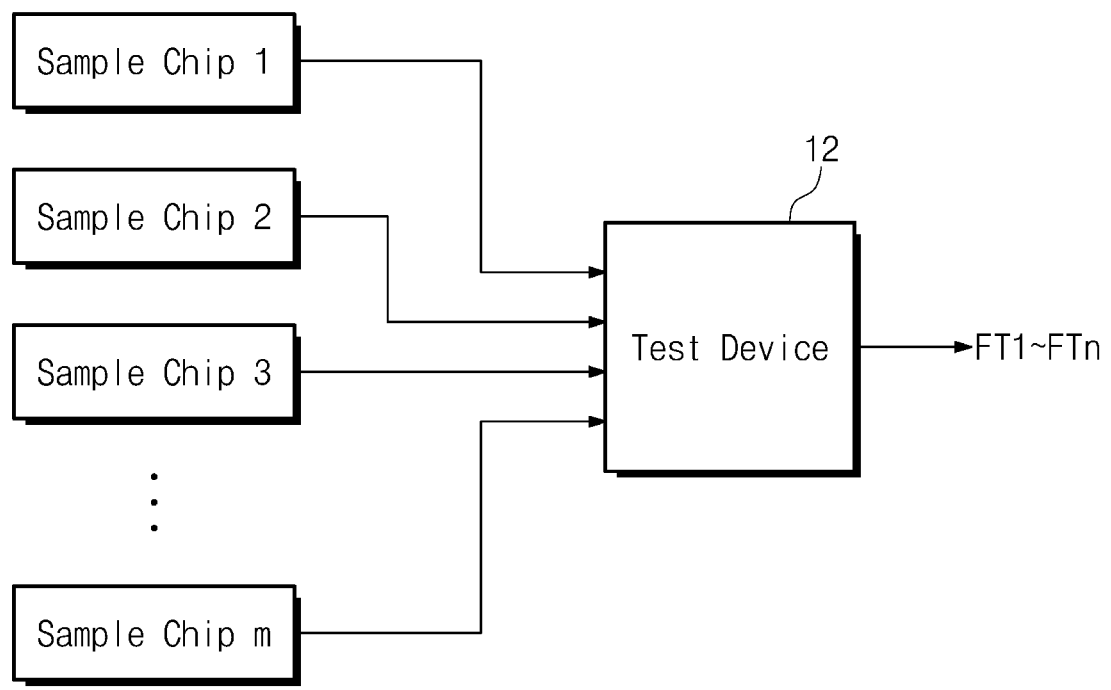
Figure 7B:
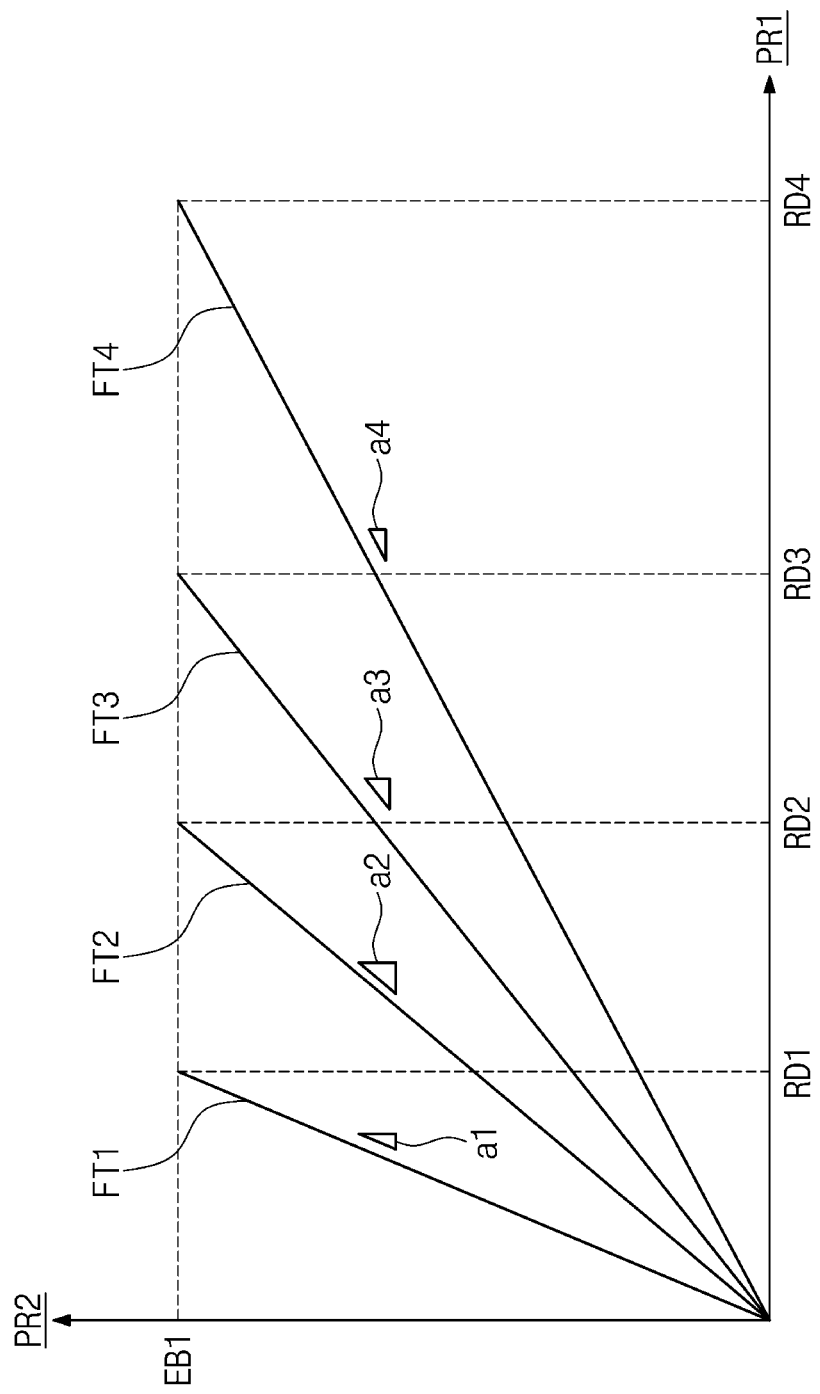

FIG. 6 is a flowchart illustrating a method for generating a function model unit of FIG. 5. FIGS. 7A to 7C are diagrams for describing an operation according to the flowchart of FIG. 6. For convenience of description, it is assumed that the first parameter indicates a read count of a memory block and the second parameter indicates a magnitude of an error occurring at the memory block. However, the inventive concept is not limited thereto.

Referring to FIGS. 6 and 7A to 7C, in operation S110, a test device 12 may measure the first parameter and the second parameter from a plurality of sample chips (e.g., Sample Chip 1, 2, 3, . . . , m). For example, as illustrated in FIG. 7A, the test device 12 may repeatedly perform various normal operations on the respective sample chips and may measure the first and second parameters from the sample chips while the normal operations are repeatedly performed. As described above, the first parameter may indicate the degree of degradation forced to each sample chip, and the second parameter may indicate the degree of degradation occurring at each sample chip.

In operation S120, the test device 12 may generate a plurality of function models based on the measured parameters. For example, as illustrated in FIG. 7B, the test device 12 may generate first, second, third and fourth function models FT1, FT2, FT3 and FT4. In a graph illustrated in FIG. 7B, a horizontal axis represents the first parameter PR1 (e.g., a read count), and a vertical axis represents the second parameter PR2 (e.g., the number of error bits).

The first to fourth function models FT to FT4 may indicate different error tendencies. For example, as illustrated in FIG. 7B, the tendency of error according to the first function model FT1 may reach the first number of error bits EB1 at a read count RD1. The tendency of error according to the second function model FT2 may reach the first number of error bits EB1 at a read count RD2. The tendency of error according to the third function model FT3 may reach the first number of error bits EB1 at a read count RD3. The tendency of error according to the fourth function model FT4 may reach the first number of error bits EB1 at a read count RD4. In other words, the first to fourth function models FT1 to FT4 may be linear models having first, second, third and fourth slopes a1, a2, a3 and a4, respectively.

To describe the degree of degradation of a memory block, it is assumed that the first function model FT1 is generated based on a first sample chip and the second function model FT2 is generated based on a second sample chip. In this case, as described above, the first function model FT may reach the first number of error bits EB1 at the first read count RD1, and the second function model FT2 may reach the first number of error bits EB1 at the second read count RD2. Here, the first read count RD1 may be smaller than the second read count RD2. Accordingly, the first sample chip that is used as a base of the first function model FT1 may degrade more quickly than the second sample chip that is used as a base of the second function model FT2. In other words, with regard to a read count, the number of error bits of the first sample chip may quickly increase compared to the second sample chip.

Returning to FIG. 6, after operation S120, in operation S130, the test device 12 may store the generated function models in the storage controller 110. For example, information about the plurality of function models may be stored in the function model unit 111d of the storage controller 110. For example, as illustrated in FIG. 7C, the function model unit 111d may include information about various function models.

In an exemplary embodiment of the inventive concept, the function model unit 111d illustrated in FIG. 7C shows function models in which various parameters are applied to one memory block, e.g., a first memory block. For example, the first parameter may be one of a read count, the number of P/E cycles, a retention, and a temperature, and the second parameter may be one of the number of error bits and a cell count. The test device 12 may measure the first and second parameters of the first memory block, may generate function models FT11 to FT42 corresponding to the measured parameters, and may decide a relevant factor (e.g., slope information a11 to a42). In other words, with regard to the first memory block, a plurality of function models may be generated based on various parameters.

In an exemplary embodiment of the inventive concept, the plurality of function models or the function model unit 111d may be stored in the ROM 114 of the storage controller 110 in the form of firmware. Alternatively, the plurality of function models or the function model unit 111d may be stored in the nonvolatile memory device 120, and may be loaded onto the storage controller 110 from the nonvolatile memory device 120 by the storage controller 110 while the storage device 100 is driven.

The linear function models FT1 to FT4 are described with reference to the graph of FIG. 7B, but the inventive concept is not limited thereto. For example, various function models may be modeled to a log scale model or an exponential model, as well as a linear model.

Figure 8:
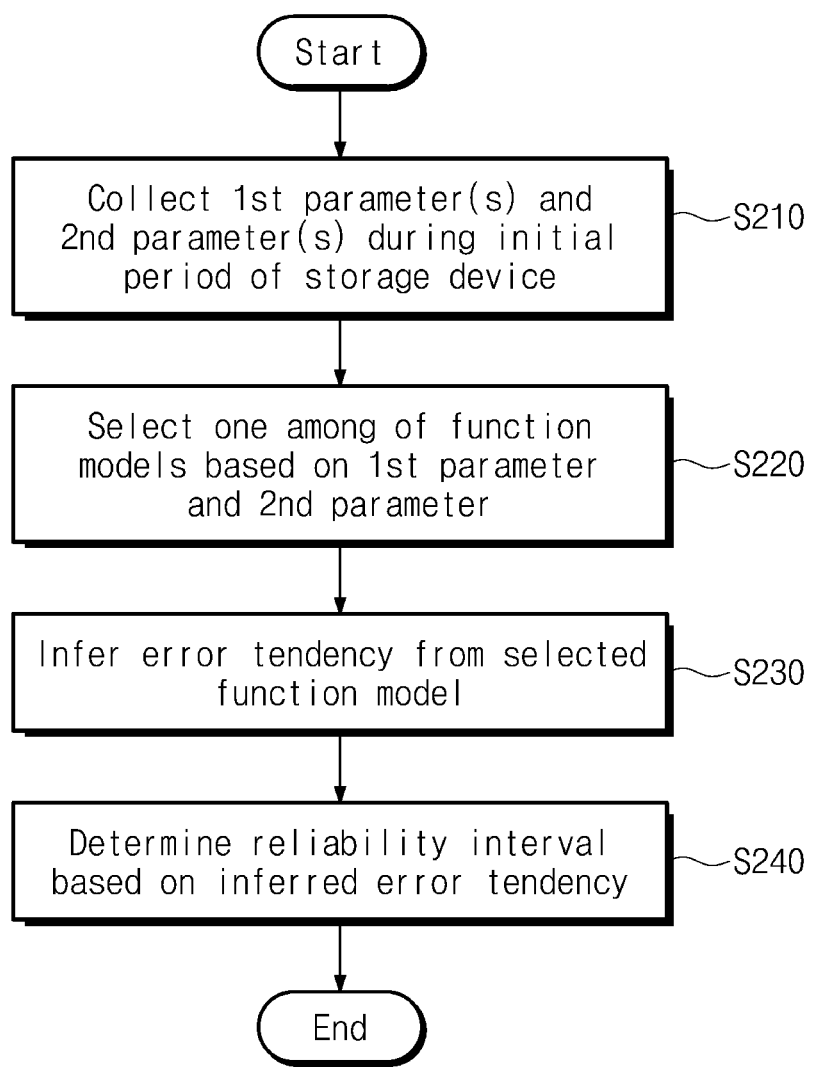
FIG. 8 is a flowchart illustrating a reliability interval managing operation of a reliability manager of FIG. 5.
Figure 9:
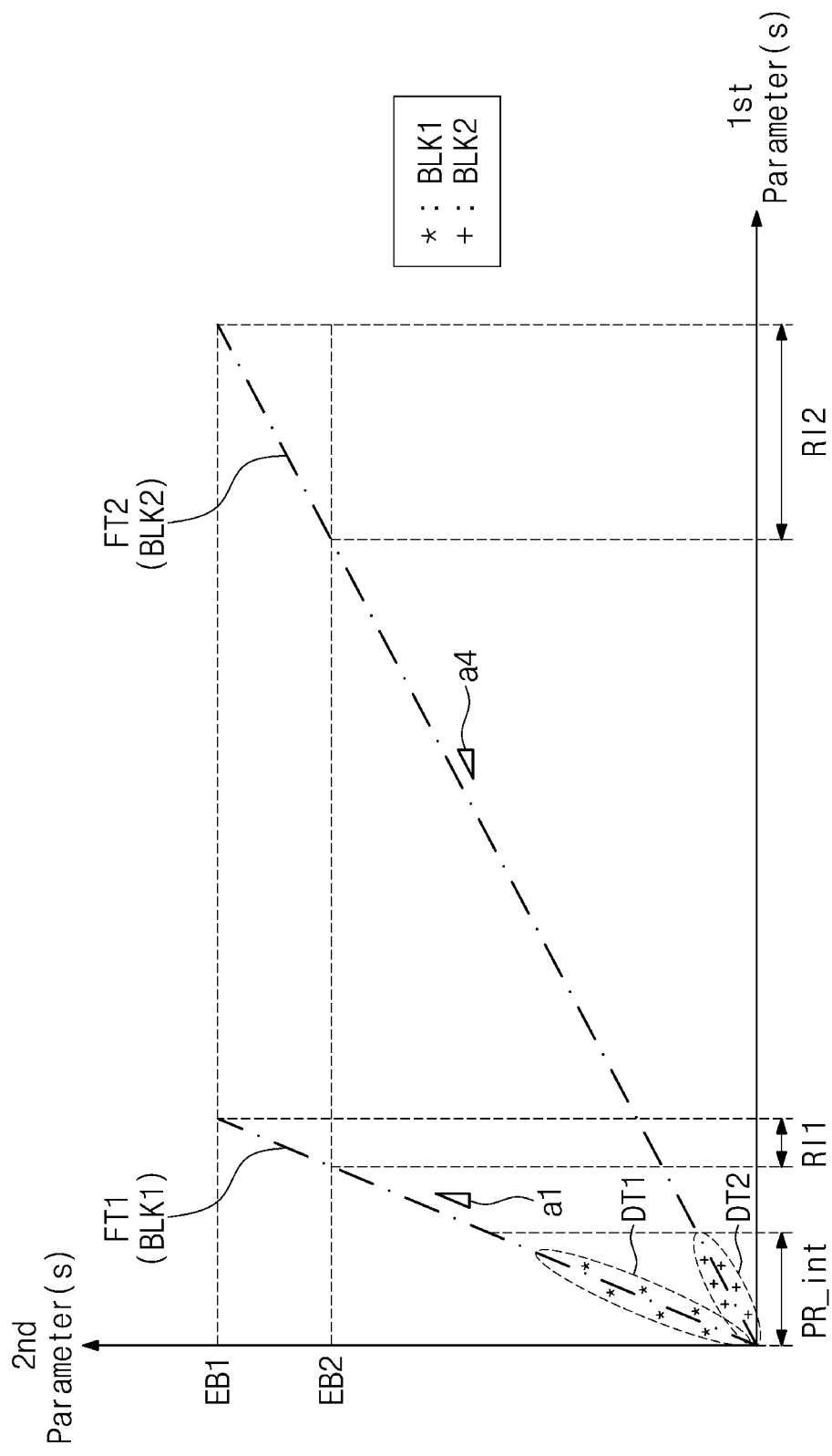
FIG. 9 is a graph for describing operation S220 of FIG. 8.

FIG. 8 is a flowchart illustrating a reliability interval managing operation of a reliability manager of FIG. 5. FIG. 9 is a graph for describing operation S220 of FIG. 8. In the graph illustrated in FIG. 9, a horizontal axis represents the first parameter, and a vertical axis represents the second parameter. For convenience, the description which follows will be given as the storage controller 110 performs an operation according to the flowchart of FIG. 8. However, the inventive concept is not limited thereto. For example, the flowchart of FIG. 8 may be performed by the storage controller 110 or at least one of various components included in the storage controller 110, for example, the processor 112 or the reliability manager 111.

Referring to FIGS. 1, 5, and 8, in operation S210, the storage controller 110 may collect the first and second parameters during an initial driving period of the storage device 100. For example, the storage controller 110 may perform a normal operation (e.g., a management operation such as a read operation, a program operation, an erase operation, or a garbage collection operation). The storage controller 110 may collect the first and second parameters of the nonvolatile memory device 120 during an initial driving period of the normal operation of the storage device 100. In an exemplary embodiment of the inventive concept, the first parameter may be at least one of factors, which indicate the degree of degradation forced to the nonvolatile memory device 120, such as an operation count, the number of P/E cycles, a retention, and a temperature. The second parameter may be at least one of factors, which indicate the degree of degradation occurring at the nonvolatile memory device 120, such as an error bit and a cell count.

In an exemplary embodiment of the inventive concept, the initial driving period of the storage device 100 may indicate a predetermined period (e.g., a use time or an operation count) from a time at which the storage device 100 is actually used by the user. Alternatively, the initial driving period may indicate a predetermined period from a time at which an operation of the nonvolatile memory device 120 is initiated. Alternatively, the initial driving period of the storage device 100 may indicate a predetermined period from a particular time. In other words, the storage controller 110 may collect the first and second parameters during a predetermined period from a time at which the storage device 100 is actually first used or may collect the first and second parameters during a predetermined period from a particular time while the storage device 100 is used.

In operation S220, the storage controller 110 may select one of a plurality of function models based on the first and second parameters. The storage controller 110 may select one of the plurality of function models based on a distribution of the first and second parameters.

For example, the storage controller 110 may collect the first and second parameters of the first memory block BLK1 during the initial driving period PR_int, and the first and second parameters of the first memory block BLK1 thus collected are marked by a symbol of "*" in FIG. 9. The storage controller 110 may collect the first and second parameters of the second memory block BLK2 during the initial driving period PR_int, and the first and second parameters of the second memory block BLK2 thus collected are marked by a symbol of "+" in FIG. 9. In other words, the storage controller 110 may obtain the first and second parameters of the first and second memory blocks BLK1 and BLK2 in the initial driving period PR_int.

As illustrated in the graph of FIG. 9, the first and second parameters of the first memory block BLK1 may have a first distribution DT1. In this case, the first distribution DT1 may have a shape that increases with the first slope a1. In other words, the tendency of error of the first memory block BLK1 may correspond to the first function model FT having the first slope a1.

As illustrated in the graph of FIG. 9, the first and second parameters of the second memory block BLK2 may have a second distribution DT2. In this case, the second distribution DT2 may have a shape that increases with the fourth slope a4. In other words, the tendency of error of the second memory block BLK2 may correspond to the fourth function model FT4 having the fourth slope a4. In other words, the storage controller 110 may select the first function model FT1 with respect to the first memory block BLK1 and may select the fourth function model FT4 with respect to the second memory block BLK2. For example, the storage controller 110 may access the function model unit 111d to obtain the first and fourth function models FT1 and FT4.

In operation S230, the storage controller 110 may infer or predict the tendency of error based on the selected function model. For example, as described above, each of the plurality of function models may include information about the tendency of error. The storage controller 110 may infer or predict the tendency of error of each memory block based on the selected function model.

In operation S240, the storage controller 110 may determine the reliability interval based on the inferred tendency of error. For example, as described with reference to FIG. 9, the first function model FT1 may be selected as a function model of the first memory block BLK1. The second function model FT2 may be selected as a function model of the second memory block BLK2.

The storage controller 110 may decide an increment of a first parameter value while a second parameter value of the first function model FT1 increases from the second number of error bits EB2 to the first number of error bits EB1, as a first reliability interval RI1 of the first memory block BLK. The storage controller 110 may decide an increment of a first parameter value while a second parameter value of the second function model FT2 increases from the second number of error bits EB2 to the first number of error bits EB1, as a second reliability interval RI2 of the second memory block BLK2. Alternatively, a first value of the first parameter corresponding to the case where the second parameter is the second number of error bits EB2 and a second value of the first parameter corresponding to the case where the second parameter is the first number of error bits EB1 may be decided based on the tendency of error inferred from the first function model FT1, and the reliability interval may be decided based on a difference of the first value and the second value.

In an exemplary embodiment of the inventive concept, the first number of error bits EB1 may indicate the maximum number of error bits correctable by the ECC engine 115. The second number of error bits EB2 may indicate the number of error bits that is smaller than the first number of error bits EB1 as much as a predetermined value.

In an exemplary embodiment of the inventive concept, the storage controller 110 may periodically perform the reliability operation described with reference to FIG. 4, based on the determined reliability interval. In other words, the storage controller 110 may collect various parameters of the nonvolatile memory device 120 in real time or in driving the storage device 100 and may apply different reliability intervals to respective memory blocks of the nonvolatile memory device 120 or to any other areas of a particular size based on the collected parameters. Accordingly, because the number of times that the reliability operation is performed on a memory block or memory area having a small degree of degradation decreases, the reduction of performance of the storage device 100 may be prevented, or the performance of the storage device 100 may be improved. In addition, because the overall number of reliability operations decreases, the overall lifetime of the storage device 100 may be improved.

Figure 10:
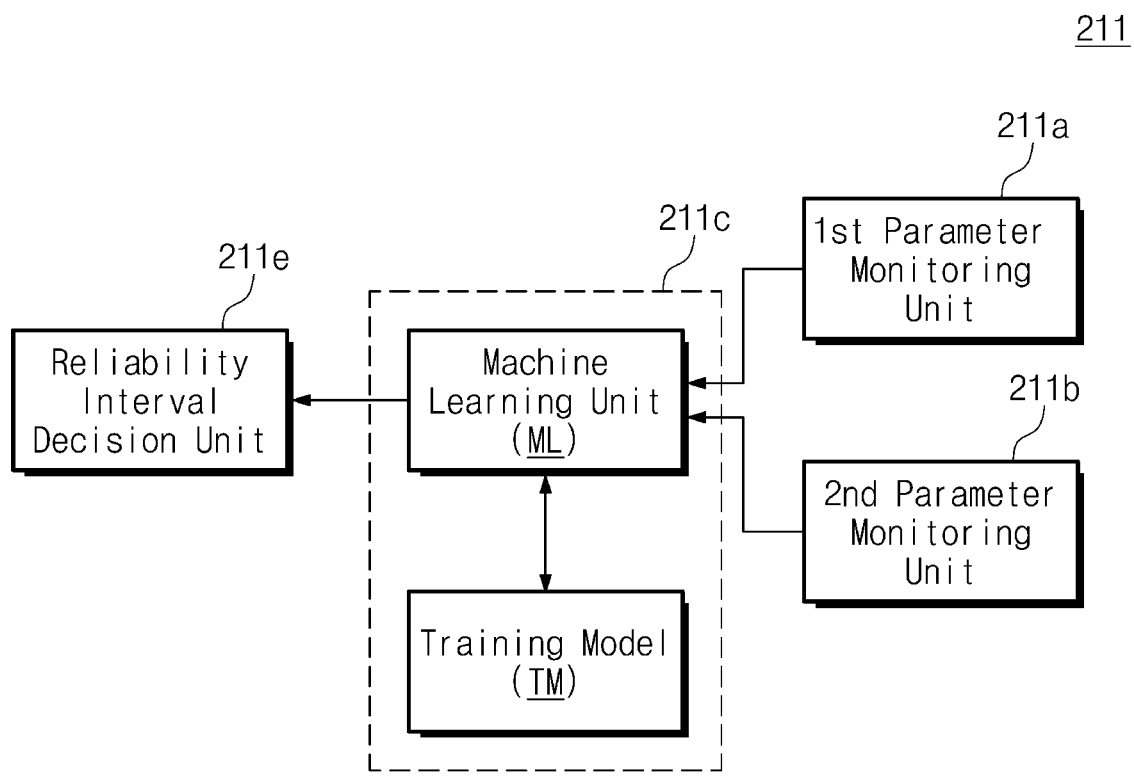
FIG. 10 is a block diagram illustrating a reliability manager according to an exemplary embodiment of the inventive concept.

FIG. 10 is a block diagram illustrating a reliability manager according to an exemplary embodiment of the inventive concept. For convenience, an additional description associated with the above components will be omitted to avoid redundancy. In an exemplary embodiment of the inventive concept, a reliability manager 211 described with reference to FIG. 10 may be applied to the storage device 100 or the storage controller 110 described with reference to FIGS. 1 and 2 or may be another example of the reliability manager 111 described with reference to FIGS. 1 and 2. In other words, the storage device 100 and the storage controller 110 may include at least one of various reliability managers 211, 311, 411, and 511 to be described with reference to the accompanying drawings or may be configured to execute at least one of the reliability managers 211, 311, 411, and 511.

Referring to FIG. 10, the reliability manager 211 may include first and second parameter monitoring units 211a and 211b, an error tendency predicting unit 211c, and a reliability interval decision unit 211e. The first and second parameter monitoring units 211a and 211b and the reliability interval decision unit 211e are similar to those described above, and thus, an additional description will be omitted to avoid redundancy.

The error tendency predicting unit 211c may include a machine learning unit ML and a training model TM. The error tendency predicting unit 211c may be implemented by a circuit. The machine learning unit ML may operate based on various machine learning algorithms such as neural network, support vector machine (SVM), linear regression, decision tree, generalized linear models (GLM), random forests, gradient boosting machine (GBM), deep learning, clustering, anomaly detection, and dimension reduction. The machine learning unit ML may receive the first parameter from the first parameter monitoring unit 211a, may receive the second parameter from the second parameter monitoring unit 211b, and may predict the tendency of error of a relevant memory block based on the training model TM trained in advance by using the first and second parameters as an input.

In an exemplary embodiment of the inventive concept, the machine learning unit ML may be provided in the form of a hardware accelerator configured to perform machine learning. Alternatively, the machine learning unit ML may be provided in the form of software configured to perform machine learning. The machine learning unit ML provided in the form of software may be stored in the SRAM 113 described with reference to FIG. 2 and may be executed by the processor 112.

In an exemplary embodiment of the inventive concept, as in the above description given with reference to FIG. 7A, the training model TM may be learned by the test device 12. For example, the test device 12 may generate the training model TM by collecting the first and second parameters from each sample chip and performing the machine learning based on the first and second parameters thus collected. The training model TM generated by the test device 12 may be included in the reliability manager 211.

In an exemplary embodiment of the inventive concept, the training model TM may have a different structure from the plurality of function models or the function model unit 111d described above. The plurality of function models or the function model unit 111d described above may be a component including information about each of various functions, and the training model TM may be a learning model for the machine learning of the machine learning unit ML. In an exemplary embodiment of the inventive concept, as an operation in which the machine learning unit ML predicts the tendency of error is performed, the training model TM may be additionally learned.

Figure 11:
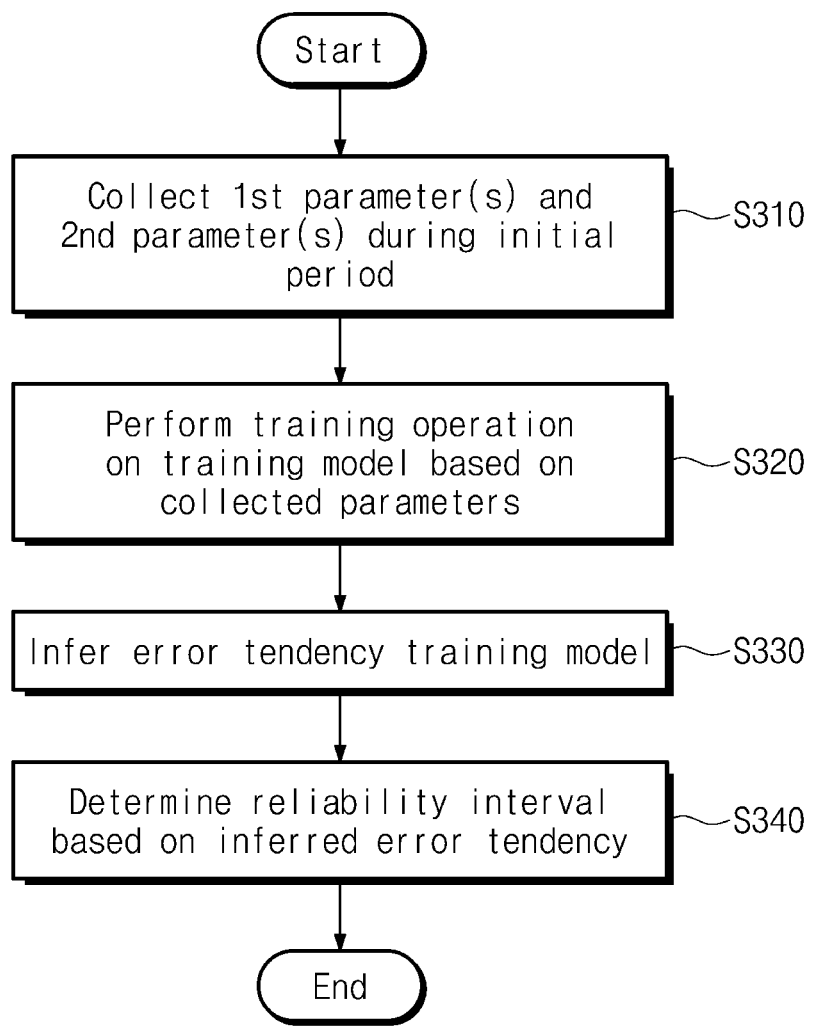
FIG. 11 is a flowchart illustrating an operation of the reliability manager of FIG. 10.

FIG. 11 is a flowchart illustrating an operation of a reliability manager of FIG. 10. For convenience, the following description will be given as the storage controller 110 of FIG. 1 performs an operation according to the flowchart of FIG. 11. In other words, the storage controller 110 of FIG. 1 may include the reliability manager 211 of FIG. 10.

In an exemplary embodiment of the inventive concept, the following description is given with reference to FIG. 10 as the training model TM is generated in advance, but the inventive concept is not limited thereto. For example, the machine learning unit ML may generate the training model TM by performing learning during an initial driving period of the storage device 100. For example, referring to FIGS. 1, 10, and 11, in operation S310, the storage controller 110 may collect the first and second parameters during the initial driving period of the storage controller 110. An operation corresponding to operation S310 may be similar to the operation corresponding to operation S210 of FIG. 8, and thus, additional description will be omitted to avoid redundancy.

In operation S320, the storage controller 110 may perform a training operation on the training model TM based on the collected first and second parameters. In other words, as the training model TM is additionally trained based on parameters collected while the storage device 100 is actually driven, an actual operation circumstance of the storage device 100 may be applied to the training model TM in real time. In this case, the accuracy of predicting the tendency of error of the nonvolatile memory device 120 may be improved. In other words, as the training model TM receives more data, the accuracy of the training model TM may increase.

In operation S330, the storage controller 110 may infer or predict the tendency of error based on the training model TM. For example, the machine learning unit ML may perform various machine teaming algorithms based on the collected first and second parameters and the learned training model TM and may infer or predict the tendency of error of a memory block. In operation S340, the storage controller 110 may decide the reliability interval based on the inferred tendency of error. Operation S340 may be similar to operation S240 of FIG. 8, and a detailed description thereof is thus omitted.

In an exemplary embodiment of the inventive concept, operation S320 and operation S330 may be performed at the same time or in parallel. For example, the machine learning unit ML may infer the tendency of error by performing machine learning based on the collected first and second parameters and the learned training model TM and may simultaneously perform a training operation on the training model TM.

As described above, the storage device 100 according to an exemplary embodiment of the inventive concept may decide the reliability interval of memory blocks of the nonvolatile memory device 120 based on the training model TM that is generated in advance or is learned while the storage device 100 is driven. Accordingly, because the reliability interval optimized for the memory blocks of the nonvolatile memory device 120 is decided depending on an actual operation circumstance of the storage device 100, the performance and lifetime of the storage device 100 may be improved.

Figure 12:
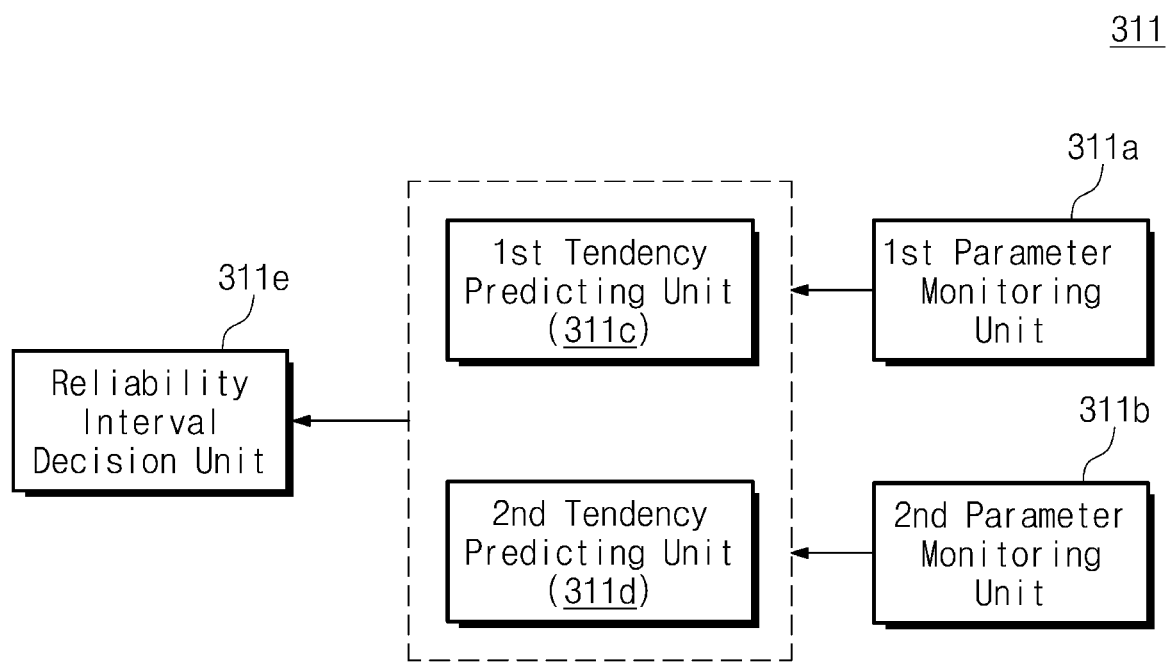
FIG. 12 is a block diagram illustrating a reliability manager according to an exemplary embodiment of the inventive concept.

FIG. 12 is a block diagram illustrating a reliability manager according to an exemplary embodiment of the inventive concept. For convenience, an additional description associated with the above components will be omitted to avoid redundancy. Referring to FIG. 12, a reliability manager 311 may include first and second parameter monitoring units 311a and 311b, a first error tendency predicting unit 311c, a second error tendency predicting unit 311d, and a reliability interval decision unit 311e. The first and second parameter monitoring units 311a and 311b and the reliability interval decision unit 311e are similar to those described above, and thus, additional descriptions will be omitted to avoid redundancy.

The first error tendency predicting unit 311c may include the function model selecting unit 111e and the function model unit 111d described with reference to FIG. 5. In other words, the first error tendency predicting unit 311c may predict the tendency of error of each memory block based on the method described with reference to FIGS. 5 to 9. The second error tendency predicting unit 311d may include the machine learning unit ML and the training model TM described with reference to FIG. 10. In other words, the second error tendency predicting unit 311d may predict the tendency of error of each memory block based on the method described with reference to FIGS. 10 to 11.

In an exemplary embodiment of the inventive concept, the reliability manager 311 may predict the tendency of error by using one of the first error tendency predicting unit 311c and the second error tendency predicting unit 311d. For example, as described above, the first error tendency predicting unit 311c may predict the tendency of error in a way to select one of a plurality of function models generated in advance. The second error tendency predicting unit 311d may predict the tendency of error in a way to perform machine learning based on the training model TM. In this case, in the initial driving period of the storage device 100, the training model TM may not be fully learned. In this case, the accuracy by which the second error tendency predicting unit 311d predicts the tendency of error may be low. Accordingly, the reliability manager 311 may predict the tendency of error through the first error tendency predicting unit 311c during the initial driving period of the storage device 100 or during a particular period and may predict the tendency of error through the second error tendency predicting unit 311d after the training model TM is fully completed or is sufficiently learned. In other words, the first error tendency predicting unit 311c may be used first followed by the second error tendency predicting unit 311d.

Figure 13:
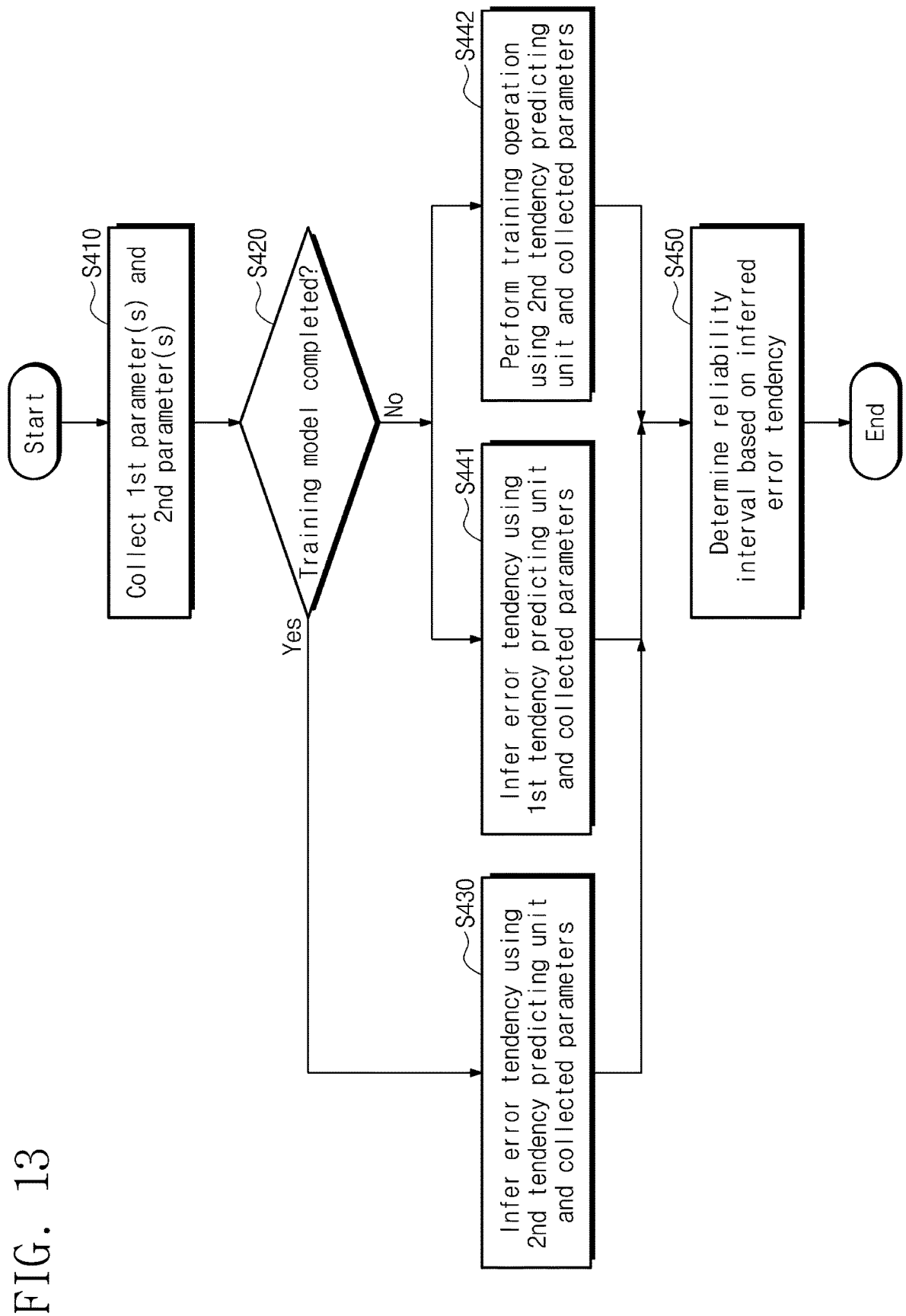
FIG. 13 is a flowchart illustrating an operation of the reliability manager of FIG. 12.

FIG. 13 is a flowchart illustrating an operation of a reliability manager of FIG. 12. For convenience, a description will be given as an operation according to the flowchart of FIG. 13 is performed by the storage controller 110 described with reference to FIGS. 1 and 2. In other words, the storage controller 110 may include the reliability manager 311 of FIG. 12 or may be configured to execute the reliability manager 311. Referring to FIGS. 1, 2, 12, and 13, in operation S410, the storage controller 110 may collect the first and second parameters.

In operation S420, the storage controller 110 may determine whether the training model TM is completed. For example, the storage controller 110 may determine whether the training model TM is completed or is sufficiently learned. In an exemplary embodiment of the inventive concept, operation S420 may be replaced with an operation where the storage controller 110 determines whether the amount of collected parameters is a reference value or greater. For example, in the case where the amount of collected parameters is sufficient, the training operation may be sufficiently performed on the training model TM such that the reliability or accuracy of the training model TM may be relatively high. In other words, the amount of collected parameters may correspond to the reliability of the training model TM, and thus, operation S420 may be replaced with an operation where the storage controller 110 determines whether the amount of collected parameters is the reference value or greater.

When it is determined that the training model TM is completed, in operation S430, the storage controller 110 may infer or predict the tendency of error by using the second error tendency predicting unit 311d and the collected parameters. Operation S430, which uses the second error tendency predicting unit 31d, is similar to the operation of inferring or predicting the tendency of error based on machine learning, which is described with reference to FIGS. 10 and 11, and thus, an additional description will be omitted to avoid redundancy.

When it is determined that the training model TM is not completed, e.g., where the amount of collected parameters is not sufficient, the storage controller 110 may perform operation S441 and operation S442. In operation S441, the storage controller 110 may infer or predict the tendency of error based on the collected parameters by using the first error tendency predicting unit 311c. Operation S441, which uses the first error tendency prediction unit 311c, is similar to the operation of selecting one of a plurality of function models and inferring or predicting the tendency of error, which is described with reference to FIGS. 5 to 9, and thus, an additional description will be omitted to avoid redundancy.

In operation S442, the storage controller 110 may perform a training operation by using the collected parameters and the second error tendency predicting unit 311d. For example, the storage controller 110 may learn the training model TM by performing the training operation based on parameters collected by using the second error tendency predicting unit 311d. In an exemplary embodiment of the inventive concept, operation S441 and operation S442 may be performed at the same time or in parallel. In operation S450, the storage controller 110 may decide the reliability interval based on the inferred tendency of error.

In an exemplary embodiment of the inventive concept, the reliability manager 311 may perform the operation described with reference to FIGS. 12 and 13 during the initial driving period of the storage device 100 where the amount of collected parameters is relatively small. However, the inventive concept is not limited thereto. For example, in the case where the training model TM is sufficiently learned in advance, the reliability manager 311 may predict the tendency of error based on machine learning of the second error tendency predicting unit 311d during the initial driving period of the storage device 100. After a predetermined period passes, the reliability manager 311 may predict the tendency of error based on a function selection of the first error tendency predicting unit 311c. The reason for this is that the number of operations necessary to perform machine learning-based inference is relatively great and the number of operations necessary to perform function selection-based inference is relatively small. In other words, in the case where the training model TM is sufficiently learned in advance, the reliability manager 311 may perform the machine learning-based inference and may perform the function selection-based inference after a predetermined period passes. The reason for this is that the reliability of the function selection-based inference is improved in the case where the amount of collected parameters is sufficient.

As described above, the reliability manager 311, or the storage controller 110 including the reliability manager 311 may infer the tendency of error by performing a function model selection-based operation or a machine learning operation depending on the amount of parameters collected during an operation of the storage device 100 or depending on a state of the training model TM, and may decide the reliability interval based on the inferred tendency of error. Accordingly, as in the above description, because the number of reliability operations to be performed unnecessarily decreases, the performance and lifetime of the storage device 100 may be improved.

Figure 14:
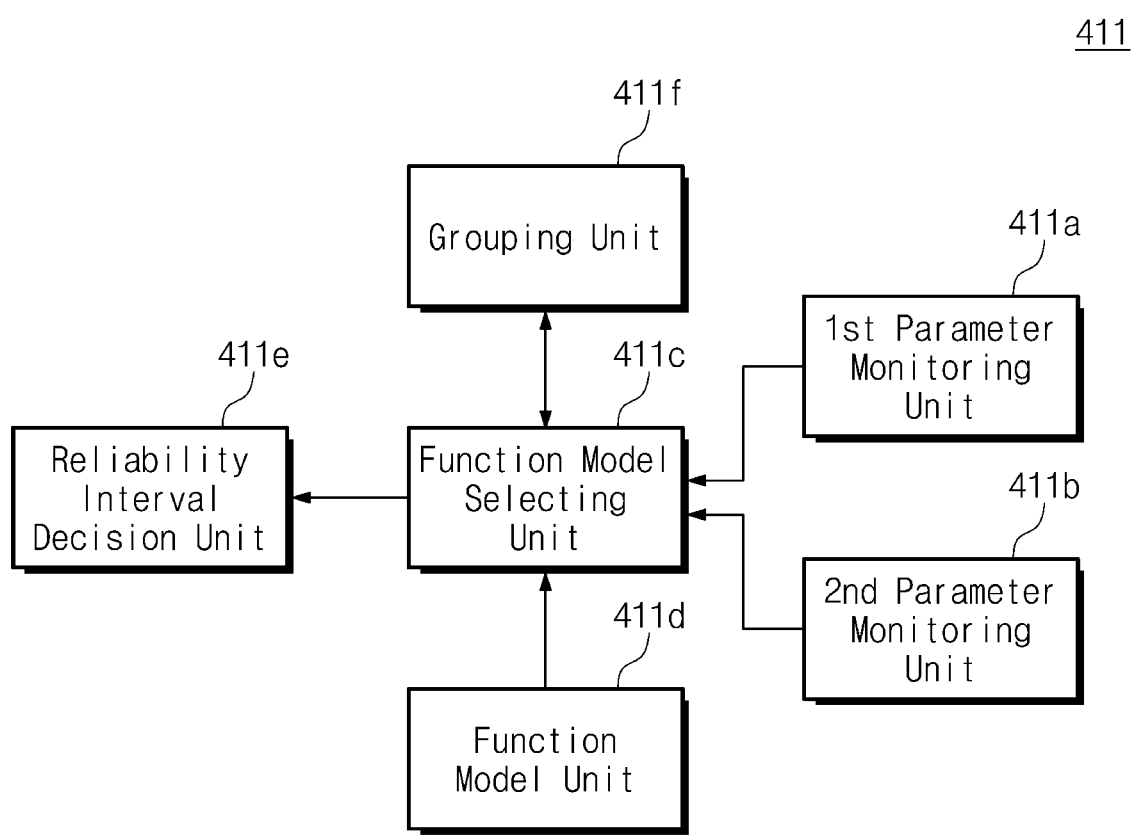
FIG. 14 is a block diagram illustrating a reliability manager according to an exemplary embodiment of the inventive concept.
Figure 15:
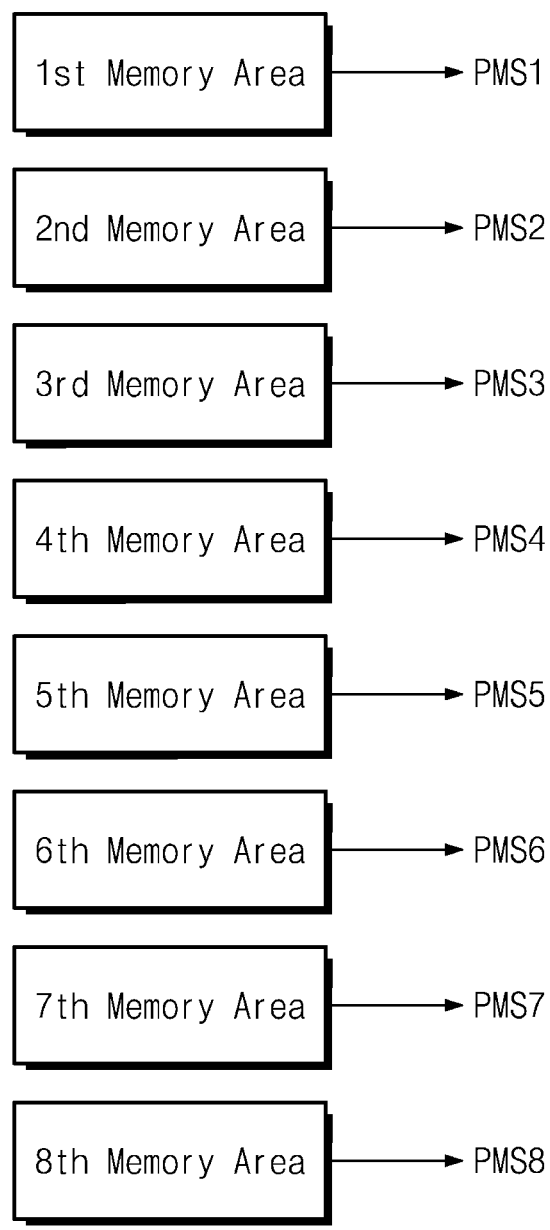
FIGS. 15 and 16 are diagrams for describing an operation of a grouping unit FIG. 14.
Figure 16:
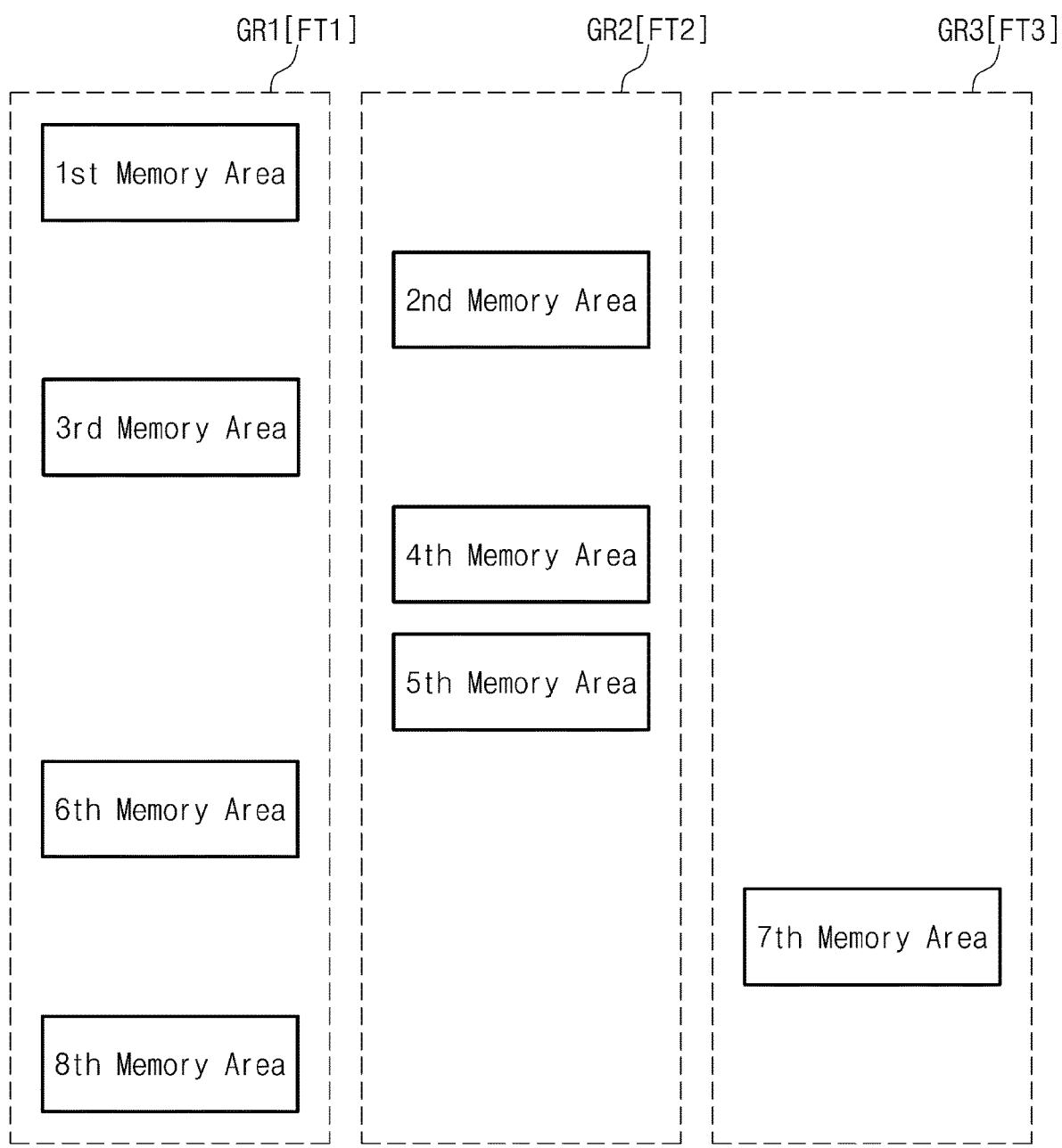

FIG. 14 is a block diagram illustrating a reliability manager according to an exemplary embodiment of the inventive concept. FIGS. 15 and 16 are diagrams for describing an operation of a grouping unit FIG. 14. For convenience of description, an additional description associated with the above components will be omitted to avoid redundancy. Referring to FIG. 14, a reliability manager 411 may include first and second parameter monitoring units 411a and 411b, a function model selecting unit 411c, a function model unit 411d, a reliability interval decision unit 411e, and a grouping unit 411f. The first and second parameter monitoring units 411a and 411b, the function model selecting unit 411c, the function model unit 411d, and the reliability interval decision unit 411e are similar to those described above, and thus, an additional description will be omitted to avoid redundancy.

The grouping unit 411f may classify a plurality of memory areas into a plurality of groups. For example, the plurality of memory areas may be included in the nonvolatile memory device 120. Each of the plurality of memory areas may indicate a unit by which the reliability interval is individually managed or controlled. In other words, each of the plurality of memory areas may be an area classified in units of a memory block, a word line, a page, a sub-block, a super block, a plane, or a chip. Hereinafter, it is assumed that one memory area corresponds to one memory block.

The grouping unit 411f may group memory areas having the same function model based on function models respectively corresponding to the plurality of memory areas. For example, as illustrated in FIGS. 15 and 16, a nonvolatile memory device may include eight memory areas. However, the inventive concept is not limited thereto and the nonvolatile memory device may include more or less than eight memory areas. The reliability manager 411 may collect a plurality of parameter sets PMS1, PMS2, PMS3, PMS4, PMS5, PMS6, PMS7 and PMS8 of the eight memory areas. Each of the plurality of parameter sets PMS1 to PMS8 may include the first and second parameters described above.

Based on the plurality of parameter sets PMS1 to PMS8, the reliability manager 411 may select a function model of each of the eight memory areas or may infer the tendency of error. The reliability manager 411 may decide the reliability interval of each of the eight memory areas based on the selected function model or the inferred tendency of error. In this case, as illustrated in FIG. 16, 1st, 3rd, 6th, and 8th memory areas may correspond to the first function model FT1, 2nd, 4th, and 5th memory areas may correspond to the second function model FT2, and a 7th memory area may correspond to the third function model FT3.

As described above, in the case where the same function model is applied to particular memory areas, the particular memory areas may have the same reliability interval. In other words, the reliability operation of the 1st, 3rd, 6th, and 8th memory areas may be performed based on a first reliability interval, the reliability operation of the 2nd, 4th, and 5th memory areas may be performed based on a second reliability interval, and the reliability operation of the 7th memory area may be performed based on a third reliability interval. The reliability intervals may correspond to at least one of the reliability intervals of FIG. 9.

As such, the grouping unit 411f may manage memory areas, which are managed with the same reliability interval, as the same group. For example, the grouping unit 411f may manage the 1st, 3rd, and 6th memory areas as a first group GR1, may manage the 2nd, 4th, and 5th memory areas as a second group GR2, and may manage the 7th memory area as a third group GR3. In this case, even though the amount of parameters collected with regard to one memory area decreases, because the inference of the tendency of error or the adjustment of the reliability interval is possible by using parameters collected with regard to any other memory area included in the same group as the one memory area, the accuracy of the reliability interval may be improved or optimized. Alternatively, in the case where the amount of parameters of the whole of the storage device 100 is large, because it is possible to decrease parameters of memory areas in the same group, the overhead due to parameters to be managed or collected may decrease.

In an exemplary embodiment of the inventive concept, the description is given as the reliability manager 411 of FIG. 14 infers the tendency of error based on a way to select a function model, but the inventive concept is not limited thereto. For example, the reliability manager 411 may infer the tendency of error to be similar to the reliability manager 211 or 311 described with reference to FIG. 10 or 12; in this case, the reliability manager 411 may group memory areas based on the inferred tendency of error or the decided reliability interval.

Figure 17:
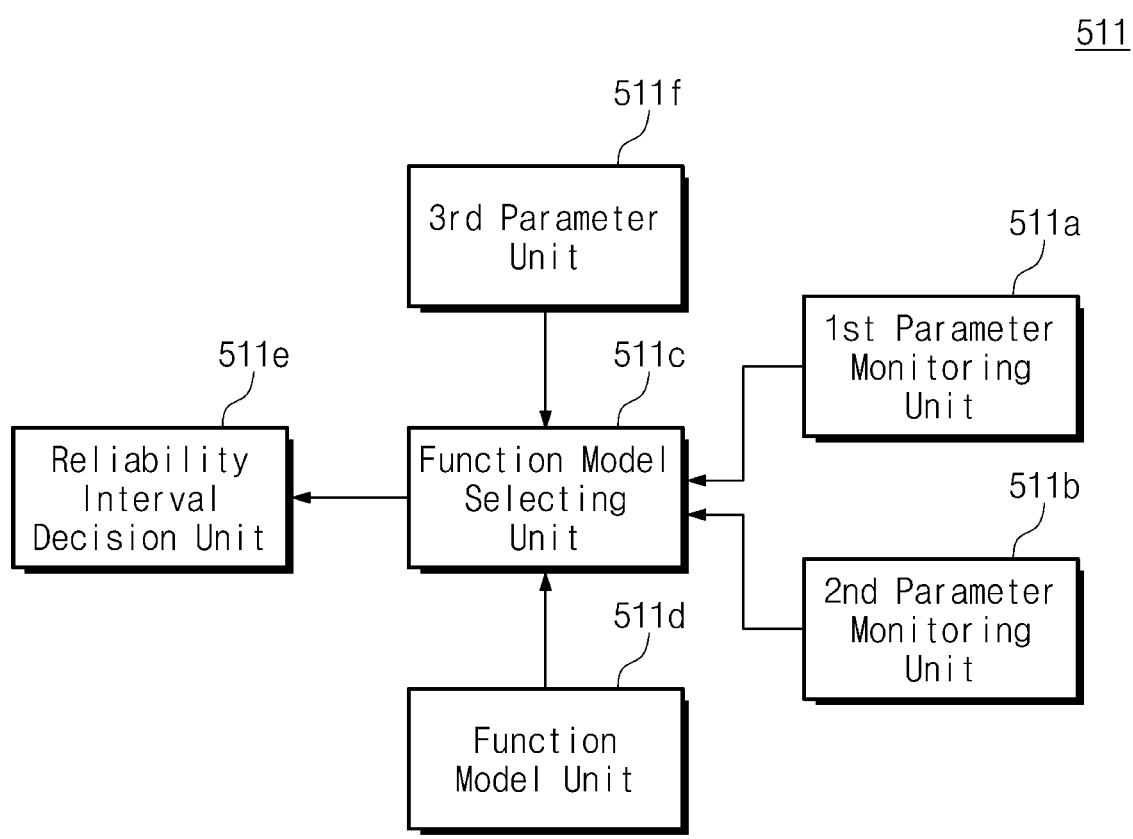
FIG. 17 is a block diagram illustrating a reliability manager according to an exemplary embodiment of the inventive concept.

FIG. 17 is a block diagram illustrating a reliability manager according to an exemplary embodiment of the inventive concept. For convenience of description, an additional description associated with the above components will be omitted to avoid redundancy. Referring to FIG. 17, a reliability manager 511 may include first and second parameter monitoring units 511a and 511b, a function model selecting unit 511c, a function model unit 511d, a reliability interval decision unit 511e, and a third parameter unit 511f. The first and second parameter monitoring units 511a and 511b, the function model selecting unit 511c, the function model unit 511d, and the reliability interval decision unit 511e are similar to those described above, and thus, additional descriptions will be omitted to avoid redundancy.

The third parameter unit 511f may include information about a physical characteristic of the nonvolatile memory device 120. For example, the third parameter unit 511f may include physical characteristic information about various memory areas (e.g., memory blocks, word lines, pages, sub-blocks, super blocks, planes, and chips) included in the nonvolatile memory device 120. The function model selecting unit 511c may select one of a plurality of function models by using the information from the third parameter unit 511f, as well as the first and second parameters from the first and second parameter monitoring units 511a and 511b. For example, memory blocks included in the nonvolatile memory device 120 may have different physical characteristics. In other words, even though the collected first and second parameters are identical, the tendency of error may be different appear depending on a physical position of a memory block, a shape of a memory block, or the size of a memory block. When selecting a function model, the function model selecting unit 511c may select the function model in consideration of a physical characteristic of a memory block, as well as the first and second parameters.

Figure 18:
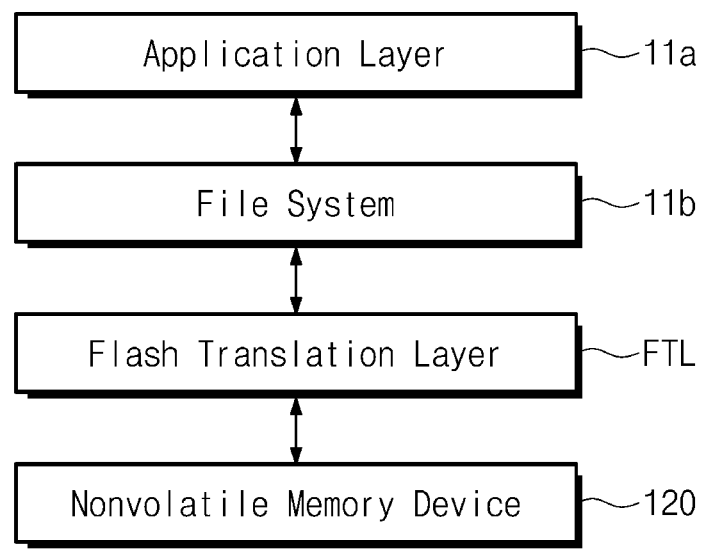
FIG. 18 is a block diagram illustrating a hierarchical structure of the storage system of FIG. 1.

FIG. 18 is a block diagram illustrating a hierarchical structure of a storage system of FIG. 1. Referring to FIGS. 1 and 18, the hierarchical structure of the storage system 10 may include software layers such as an application layer 11a, a file system 11b, and a flash translation layer FTL.

The application layer 11a may be a layer in which various application programs are driven at the host 11. The file system 11b may organize files or data used by the application layer 11a when storing the files or data in the nonvolatile memory device 120. For example, the file system 11b may manage a storage space of the storage device 100 by using logical addresses. The file system 11b may assign logical addresses to data to be stored in the storage device 100 for management. In an exemplary embodiment of the inventive concept, the file system 11b may include File Allocation Table (FAT), FAT32, NT File System (NTFS), Hierarchical File System (HFS), Journaled File System2 (JFS2), XFS, On-Disk Structure-5 (ODS-5), UDF, ZFS, Unix File System (UFS), ext2, ext3, ext4, ReiserFS, Reiser4, ISO 9660, Gnome VFS, BFS, or WinFS depending on an operating system (OS) of the host 11.

The flash translation layer FTL may provide an interface between the host 11 and the nonvolatile memory device 120 such that the nonvolatile memory device 120 is efficiently used. For example, the flash translation layer FTL may perform an operation of translating a logical address managed by the file system 11b into a physical address of the nonvolatile memory device 120. The flash translation layer FTL manages the address translation operation through a mapping table. In an exemplary embodiment of the inventive concept, the flash translation layer FTL may include at least one of the reliability managers 111, 211, 311, 411, and 511 described with reference to FIGS. 1 to 17 or may be configured to execute at least one of the reliability managers 111, 211, 311, 411, and 511. In an exemplary embodiment of the inventive concept, the flash translation layer FTL may be executed by the processor 112 described with reference to FIG. 2.

The reliability manager described with reference to FIG. 18 is merely exemplary, and the inventive concept is not limited thereto. For example, the reliability managers 111, 211, 311, 411, and 511 described with reference to FIGS. 1 to 17 may be implemented in the form of software, hardware, or a combination thereof and may be included in various components of the storage controller 110. For example, the reliability managers 111, 211, 311, 411, and 511 described with reference to FIGS. 1 to 17 may be included in the nonvolatile memory interface circuit 117 of the storage controller 110 in the form of a hardware IP.

Figure 19:
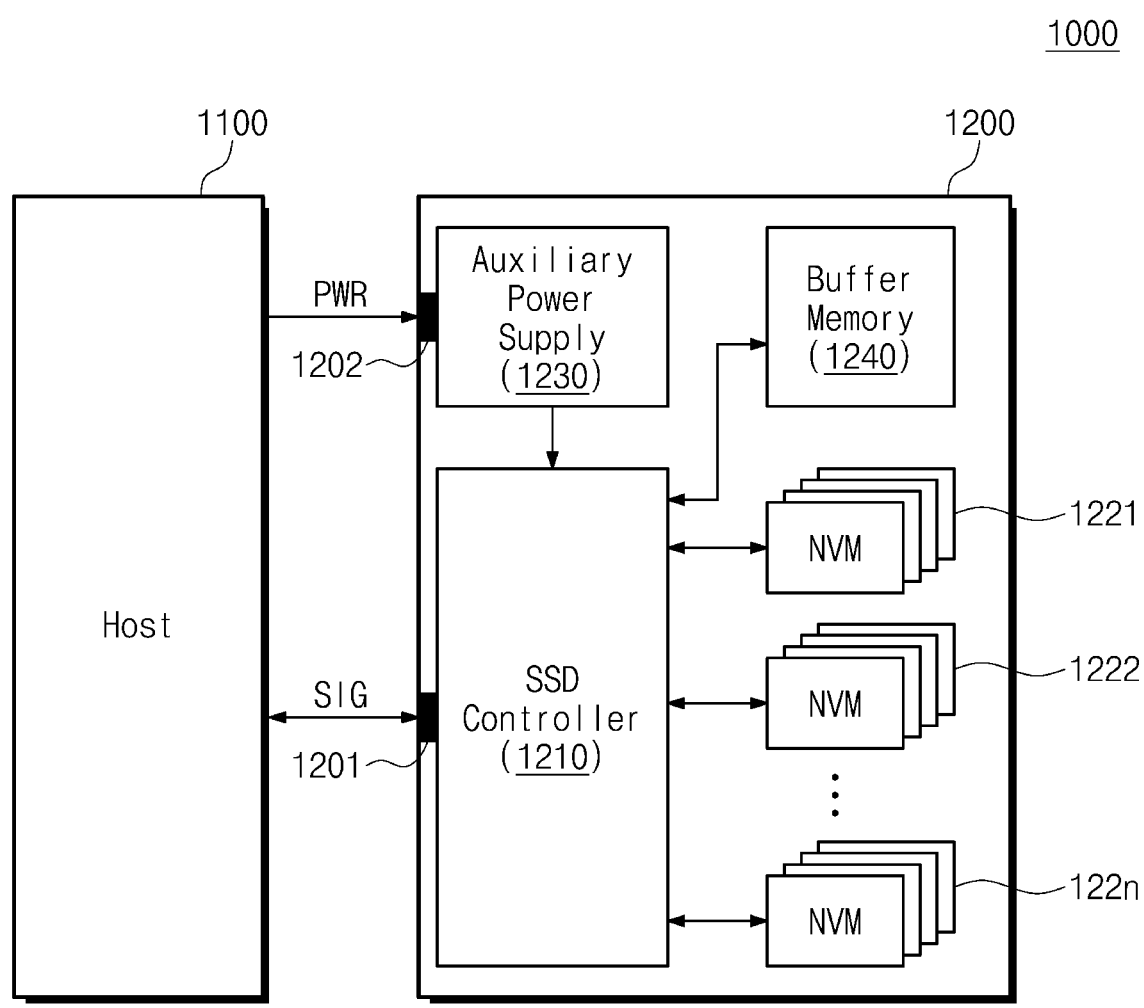
FIG. 19 is a block diagram illustrating a solid state drive system to which a storage device according to an exemplary embodiment of the inventive concept is applied.

FIG. 19 is a block diagram illustrating a solid state drive (SSD) system to which a storage device according to the inventive concept is applied. Referring to FIG. 19, an SSD system 1000 may include a host 1100 and a storage device 1200. The SSD 1200 exchanges a signal SIG with the host 1100 through a signal connector 1201 and is supplied with a power PWR through a power connector 1202. The storage device 1200 includes a solid state drive (SSD) controller 1210, a plurality of nonvolatile memories 1221 to 122n, an auxiliary power supply 1230, and a buffer memory 1240.

The SSD controller 1210 may control the nonvolatile memories 1221 to 122n in response to the signal SIG received from the host 1100. The nonvolatile memories 1221 to 122n may operate under the control of the SSD controller 1210. In an exemplary embodiment of the inventive concept, the SSD controller 1210 may be the storage controller 110 described with reference to FIGS. 1 to 18 or may include at least one of the reliability managers 111, 211, 311, 411, and 511 described with reference to FIGS. 1 to 18. The SSD controller 1210 may adjust the reliability interval of each of the nonvolatile memory devices 1221 to 122n, each of memory blocks included therein, or a particular memory unit based on the method described with reference to FIGS. 1 to 18.

The auxiliary power supply 1230 is connected with the host 1100 through the power connector 1202. The auxiliary power supply 1230 may be charged by the power PWR supplied from the host 1100. When the power PWR is not smoothly supplied from the host 1100, the auxiliary power supply 1230 may power the storage device 1200. The buffer memory 1240 may be used as a buffer memory of the storage device 1200.

According to an exemplary embodiment of the inventive concept, a storage controller may collect various parameters of a nonvolatile memory device in driving and may adjust a reliability interval based on the collected parameters. Accordingly, since a reliability operation is performed based on a reliability interval optimized to the nonvolatile memory device, the reduction of overall performance of the storage device may be prevented. In addition, the number of reliability operations to be performed unnecessarily may decrease. Accordingly, an operation method of a storage controller configured to control the nonvolatile memory device with an improved reliability and an improved performance is provided.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. An operation method of a storage controller which includes a nonvolatile memory device, the method comprising:
   collecting a first parameter indicating a degradation factor of a first memory area of the nonvolatile memory device and a second parameter indicating a degree of degradation occurring at the first memory area, in an initial driving period;
   selecting a first function model of a plurality of function models based on the first parameter and the second parameter and predicting a first error tendency of the first memory area based on the selected first function model;
   determining a first reliability interval based on the first error tendency; and
   performing a first reliability operation on the first memory area of the nonvolatile memory device based on the first reliability interval,
   wherein the first error tendency indicates a relationship between an increase in the first parameter and an increase in the second parameter after the initial driving period,
   wherein a first value of the first parameter, which corresponds to when the second parameter is a first reference value and a second value of the first parameter, which corresponds to when the second parameter is a second reference value, are decided based on the first error tendency, and
   wherein the first reliability interval is determined based on a difference of the first value and the second value.

2. The method of claim 1, wherein the first parameter includes an operation count, a number of program/erase cycles, a data retention, or a temperature of the first memory area, and
   wherein the second parameter includes a number of error bits occurring at the first memory area or a cell count value of the first memory area.

3. The method of claim 1, wherein the initial driving period is a predetermined period from a time when a normal operation of the nonvolatile memory device is initiated.

4. The method of claim 1, Wherein the first reliability operation is performed without an explicit request from an external host device.

5. The method of claim 1, wherein the performing of the first reliability operation includes:
   accumulating a first operation count of the first memory area;
   detecting error bits of the first memory area when the first operation count reaches the first reliability interval; and
   when a number of the error bits is a reference value or greater, correcting an error of data stored in the first memory area and moving the error-corrected data from the first memory area to another storage area.

6. The method of claim 1, wherein the first memory area is a memory block, and the memory block is an erase unit of the nonvolatile memory device.

7. The method of claim 1, wherein the plurality of function models are generated based on sample parameters collected from a plurality of sample chips different from the nonvolatile memory device.

8. The method of claim 1, further comprising:
   collecting a third parameter indicating a degradation factor of a second memory area of the nonvolatile memory device and a fourth parameter indicating a degree of degradation occurring at the second memory area, in the initial driving period;
   selecting a second function model of the plurality of function models based on the third parameter and the fourth parameter and predicting a second error tendency of the second memory area based on the second function model;
   determining a second reliability interval based on the second error tendency; and
   performing a second reliability operation on the second memory area of the nonvolatile memory device based on the second reliability interval.

9. The method of claim 8, further comprising:
   managing the first and second memory areas as one group when the first and second function models are identical, when the first and second error tendencies are identical, or when the first and second reliability intervals are identical.

10. An operation method of a storage controller which is configured to control a nonvolatile memory device, the method comprising:
    obtaining a first parameter indicating a degradation factor of a first memory area of the nonvolatile memory device and a second parameter indicating a degree of degradation of the first memory area, in an initial driving period;
    determining if a training model is completed;
    if the training model is completed, identifying a first error tendency of the first memory area by performing a machine learning based on the training model and, if the training model is not completed, identifying the first error tendency of the first memory area by selecting a first function model of a plurality of function models based on the first parameter and the second parameter;
    determining a first reliability interval based on the first error tendency; and
    performing a first reliability operation on the first memory area of the nonvolatile memory device based on the first reliability interval,
    wherein the first error tendency indicates a relationship between an increase in the first parameter and an increase in the second parameter after the initial driving period,
    wherein a first value of the first parameter, which corresponds to when the second parameter is a first reference value and a second value of the first parameter, which corresponds to when the second parameter is a second reference value, are decided based on the first error tendency, and wherein the first reliability interval is determined based on a difference of the first value and the second value.

11. The method of claim 10, wherein the first parameter includes an operation count, a number of program/erase cycles, a data retention, or a temperature of the first memory area, and wherein the second parameter includes a number of error bits occurring at the first memory area or a cell count value of the first memory area.

12. The method of claim 10, wherein the training model is generated based on sample parameters obtained from a plurality of sample chips, and the training model is stored in the nonvolatile memory device.

13. The method of claim 10, wherein, when the training model is completed, the identifying of the first error tendency of the first memory area includes:

performing an additional a training operation on the training model based on the first parameter and the second parameter.

14. An operation method of a storage controller which is configured to control a nonvolatile memory device, the method comprising:

collecting a first parameter set from a first memory area of the nonvolatile memory device and collecting a second parameter set from a second memory area of the nonvolatile memory device, in an initial driving period;

predicting a first error tendency of the first memory area based on the first parameter set and predicting a second error tendency based on the second parameter set;

deciding a first reliability interval based on the first error tendency and deciding a second reliability interval based on the second error tendency; and performing a first reliability operation on the first memory area based on the first reliability interval and performing a second reliability operation on the second memory area based on the second reliability interval, wherein the first reliability interval corresponds to a difference between a first value of a first parameter of the first parameter set and a second value of the first parameter, wherein the first value of the first parameter corresponds to a first reference value of a second parameter of the first parameter set and the second value of the first parameter corresponds to a second reference value of the second parameter, wherein the first parameter indicates a degradation factor of the first memory area and the second parameter indicates a degree of degradation occurring at the first memory area.

15. The method of claim 14, wherein the first parameter set includes:

the first parameter, wherein the first parameter includes an operation count, a number of program/erase cycles, a data retention, or a temperature of the first memory area, and the second parameter, wherein the second parameter includes a number of error bits occurring at the first memory area or a cell count value of the first memory area, and wherein the second parameter set includes:

a third parameter including an operation count, a number of program/erase cycles, a data retention, or a temperature of the second memory area, and a fourth parameter including a number of error bits occurring at the second memory area or a cell count value of the second memory area.

16. The method of claim 14, wherein the predicting of the first error tendency and the predicting of the second error tendency includes:

selecting a first function model of a plurality of function models, based on the first parameter set;

predicting the first error tendency based on the first function model;

selecting a second function model of the plurality of function models, based on the second parameter set; and predicting the second error tendency based on the second function model.

17. The method of claim 14, wherein the predicting of the second error tendency includes:

performing a machine learning based on the second parameter set and a training model to predict the second error tendency.

18. The method of claim 14, further comprising:

managing the first and second memory areas as one group when the first and second error tendencies are identical or when the first and second reliability intervals are identical.

* * * * *